United States Patent [19]
Nally et al.

[11] 4,277,775
[45] Jul. 7, 1981

[54] CHARACTER RECOGNITION SYSTEM

[75] Inventors: Robert B. Nally; James F. Akister; George Trohatos, all of Waterloo, Canada

[73] Assignee: NCR Canada LTD - NCR Canada Ltee, Mississauga, Canada

[21] Appl. No.: 80,952

[22] Filed: Oct. 1, 1979

[51] Int. Cl.³ .............................................. G06K 9/68
[52] U.S. Cl. ...................... 340/146.3 Q; 340/146.3 Y
[58] Field of Search ................ 340/146.3 C, 146.3 Q, 340/146.3 AG, 146.3 Y, 146.3 R, 146.3 AQ

[56] References Cited

U.S. PATENT DOCUMENTS

| | | | |
|---|---|---|---|
| 3,492,646 | 1/1970 | Bene et al. | 340/146.3 Q |
| 3,593,285 | 7/1971 | Gillmann | 340/146.3 AG |
| 3,618,016 | 11/1971 | Van Steenis | 340/146.3 Y |
| 4,110,737 | 8/1978 | Fahey | 340/146.3 Q |

*Primary Examiner*—Leo H. Boudreau
*Attorney, Agent, or Firm*—J. T. Cavender; Wilbert Hawk, Jr.; Richard W. Lavin

[57] ABSTRACT

A character recognition system is disclosed in which feature characteristics of an analog waveform representing an unknown character are applied to a plurality of templates each representing a known character and consisting of a number of windows in which the feature characteristics of the known character are to be located. Hardware implemented circuits compare each feature characteristic of the unknown character with each window of the template. If a feature characteristic is found outside the window, the distance between the location of the feature characteristic from the location of the window is found. The sum of the distances for each template is generated and the templates having the two minimum distances are selected and evaluated to determine if a character can be recognized from the value of the two minimum distances.

9 Claims, 30 Drawing Figures

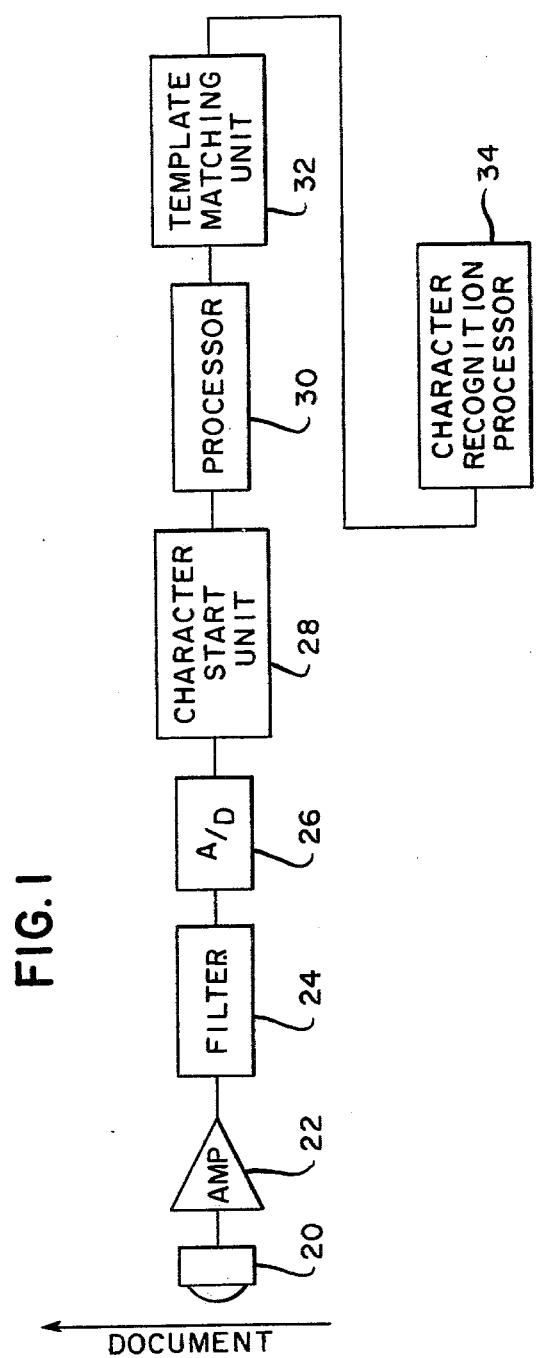

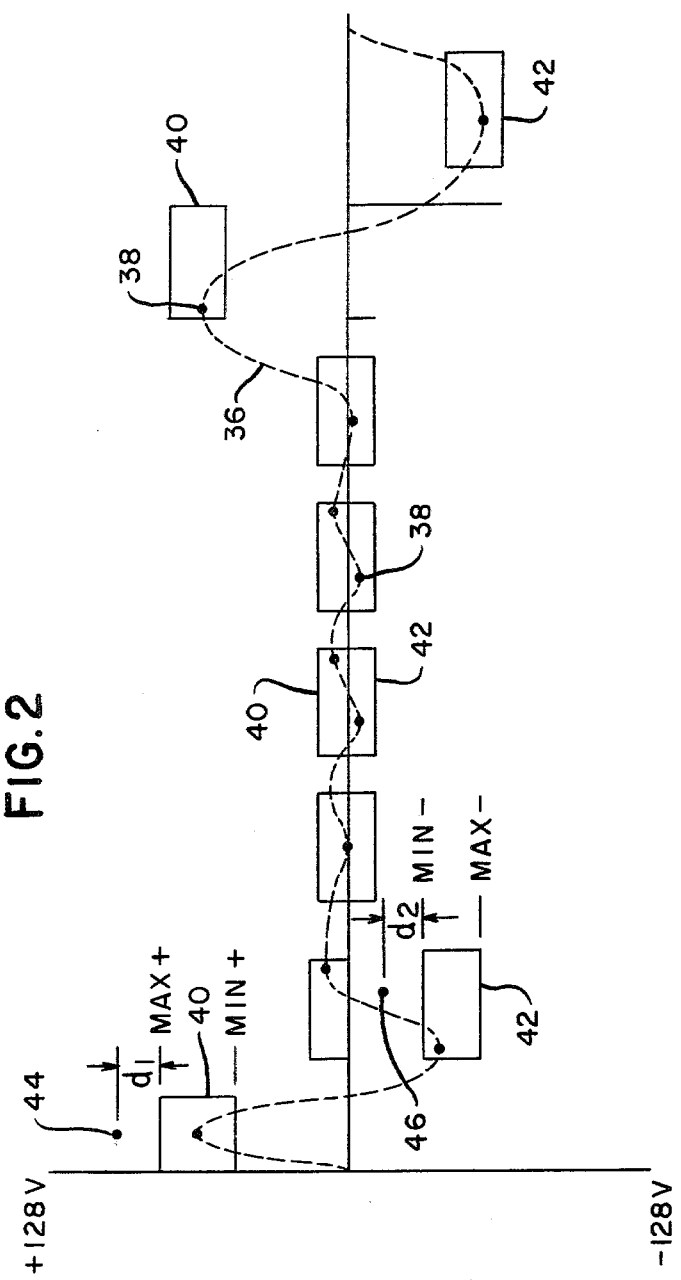

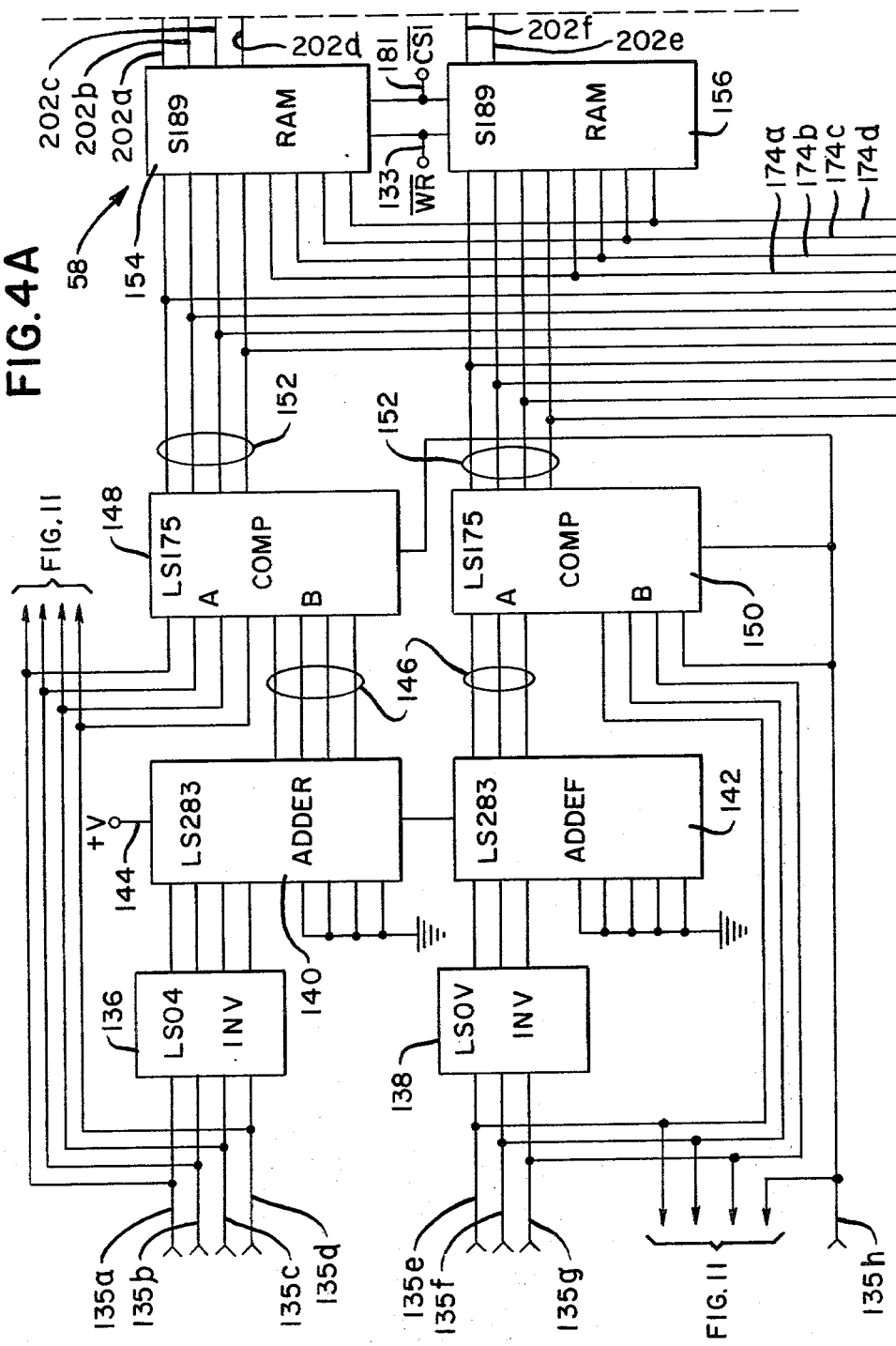

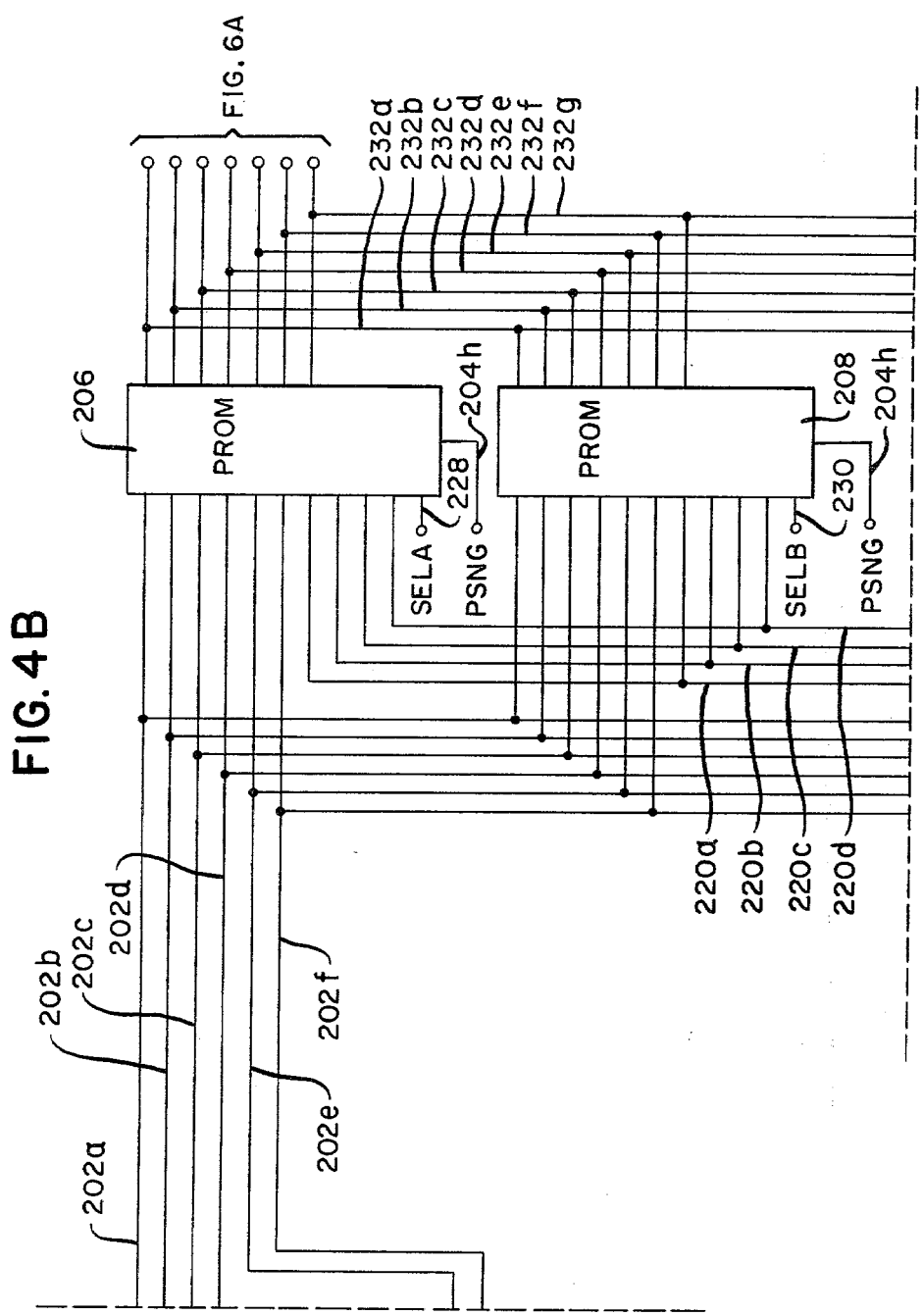

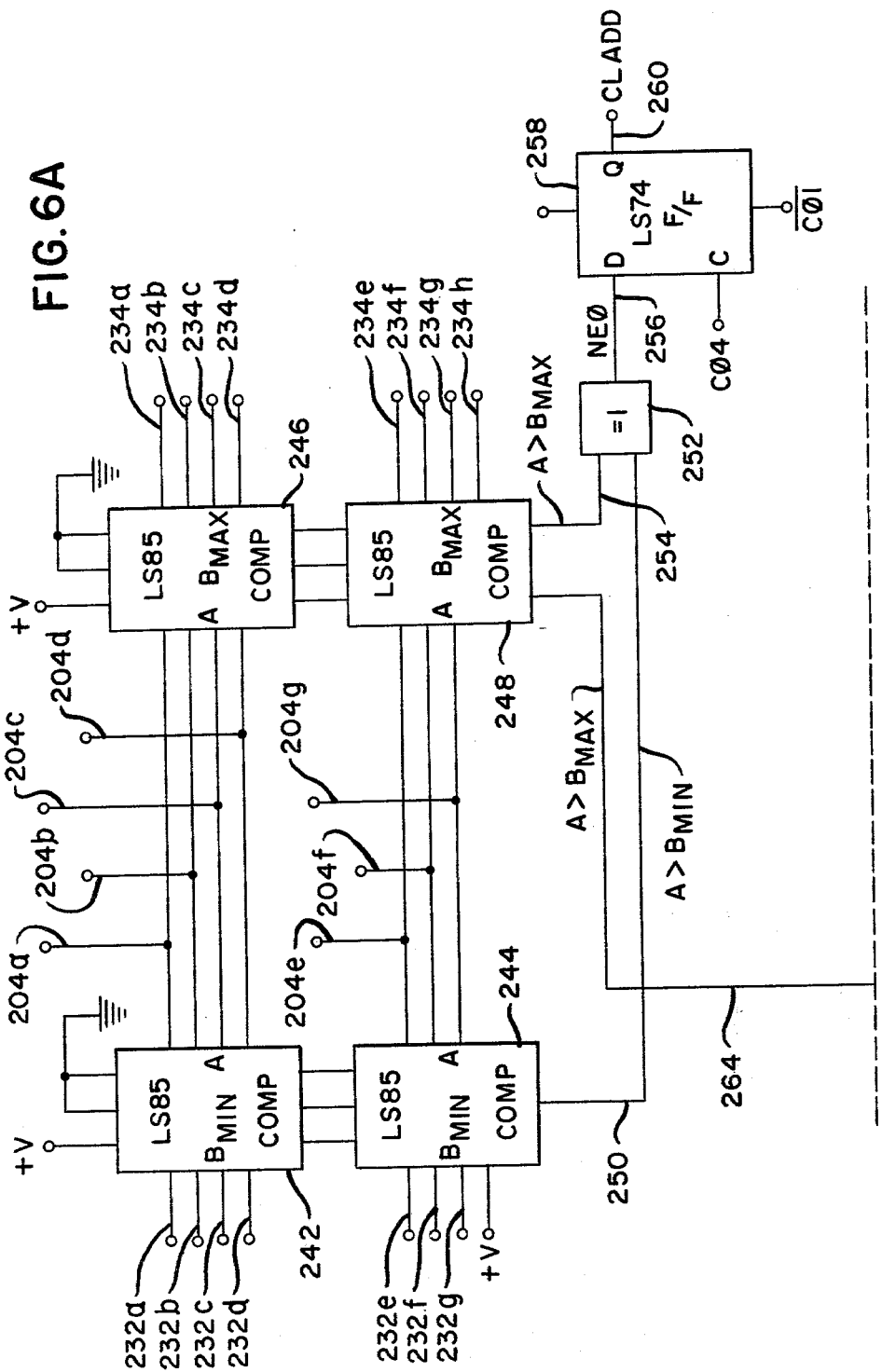

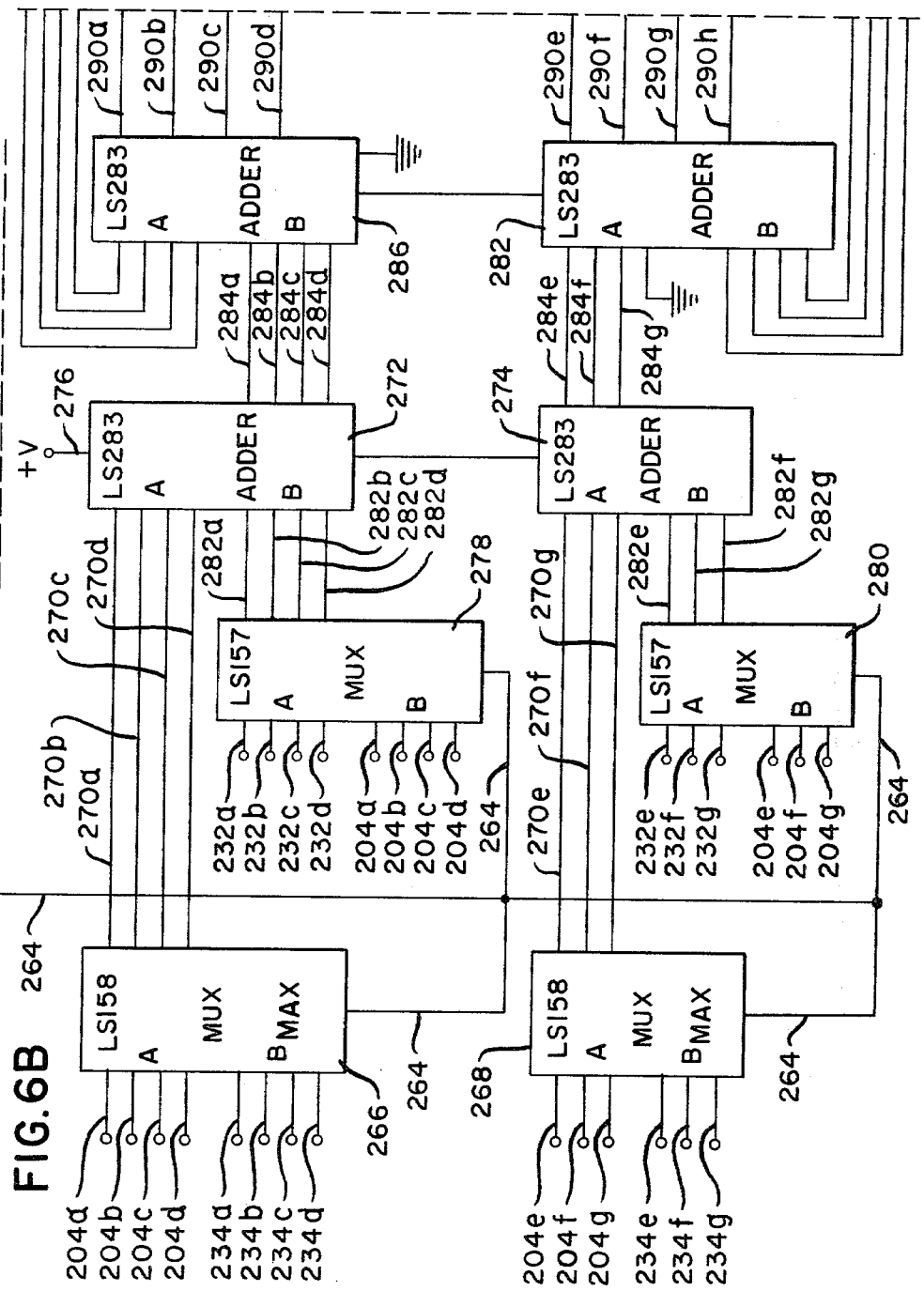

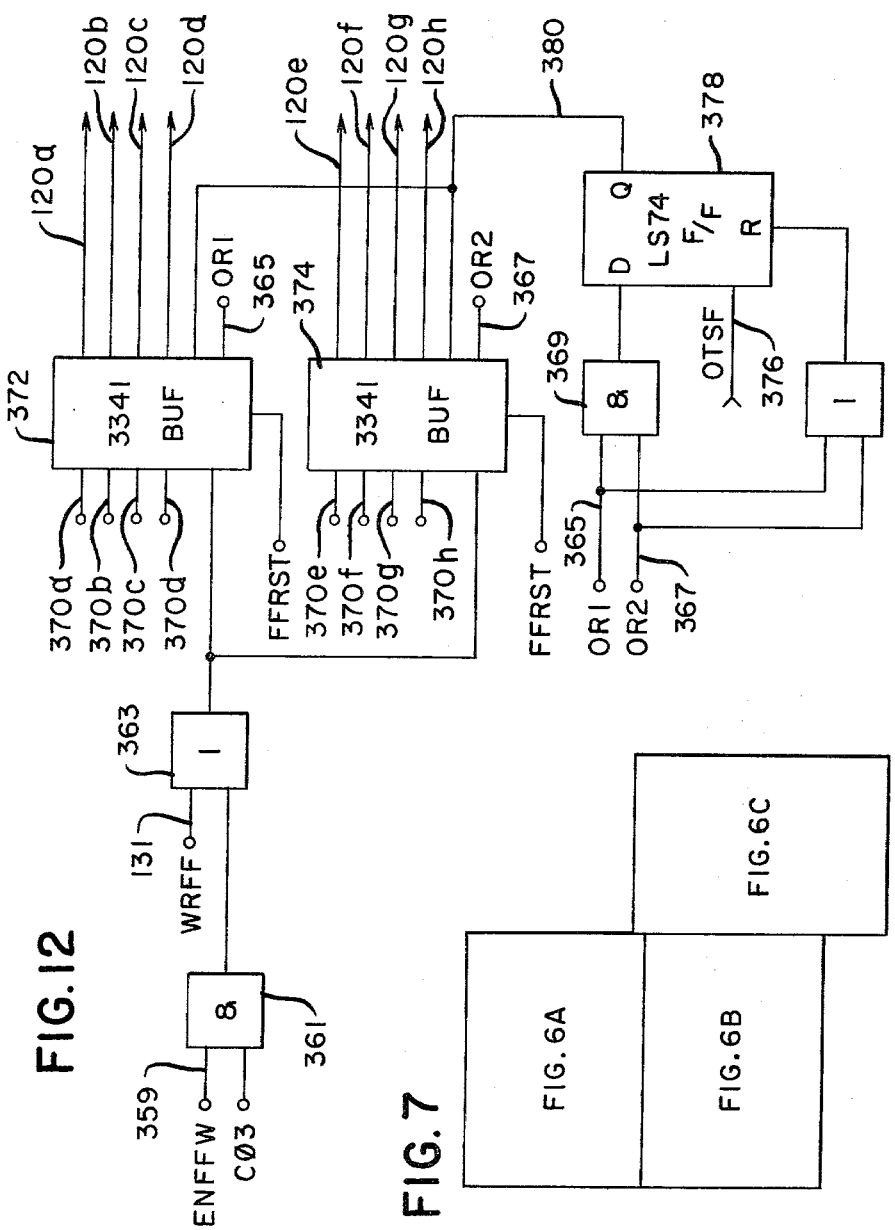

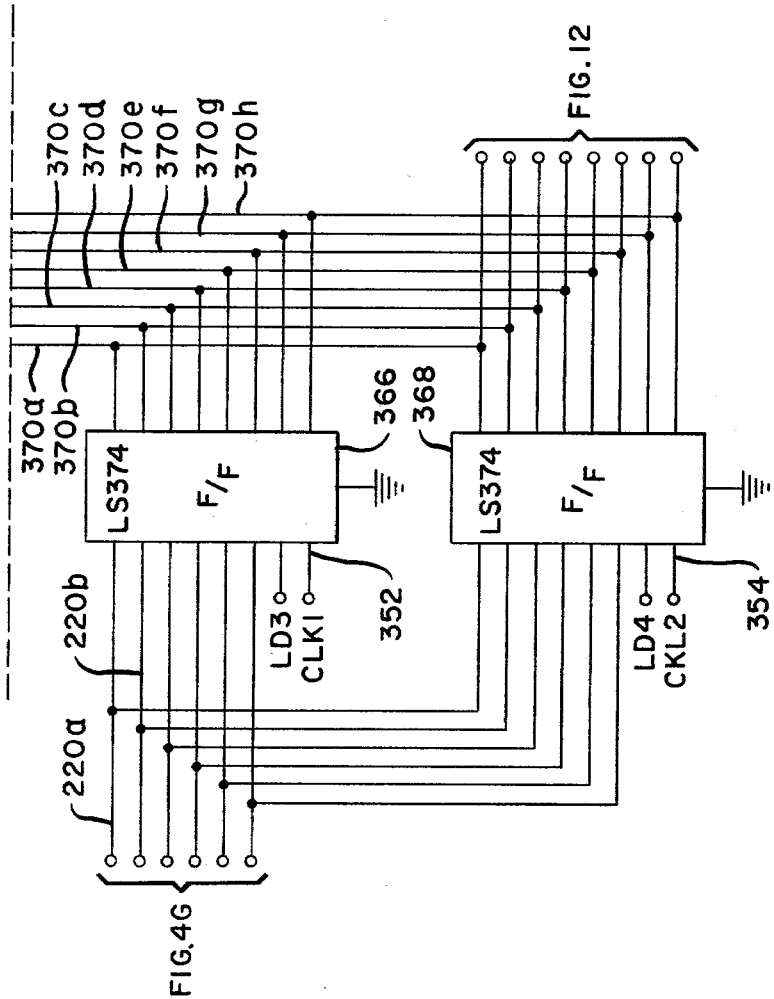

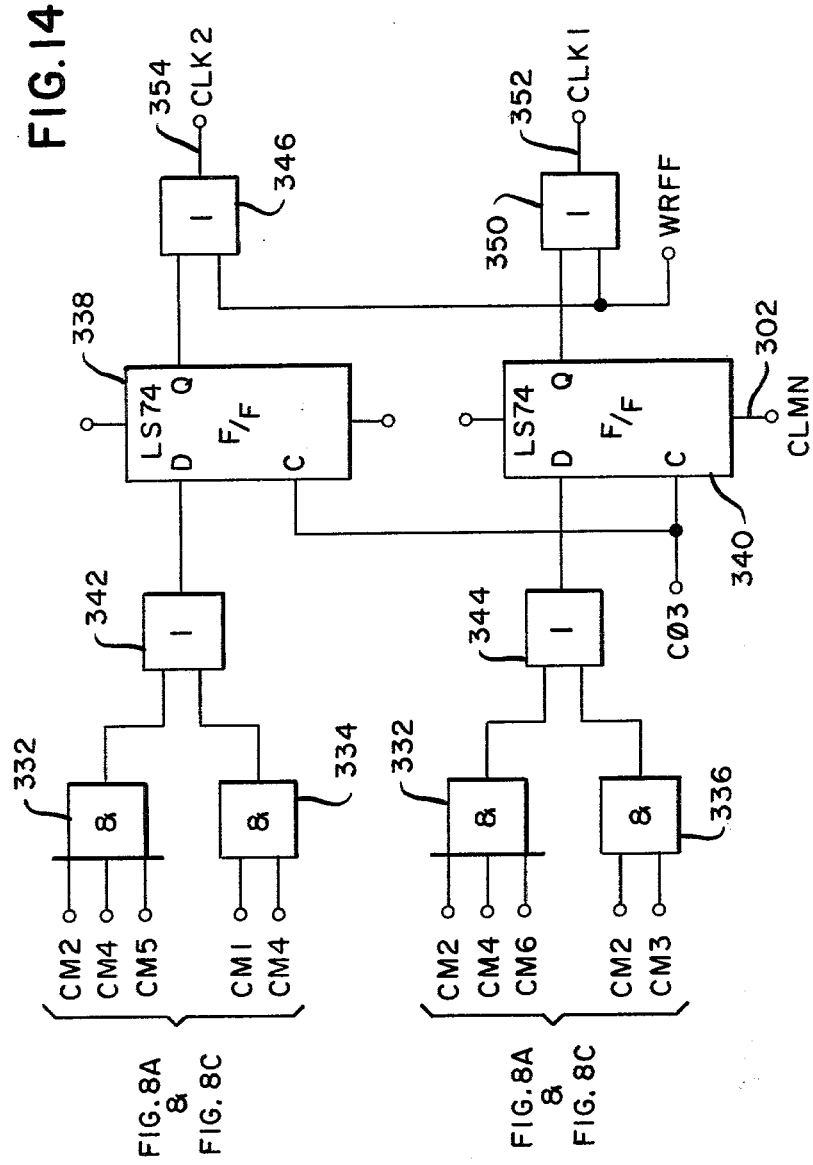

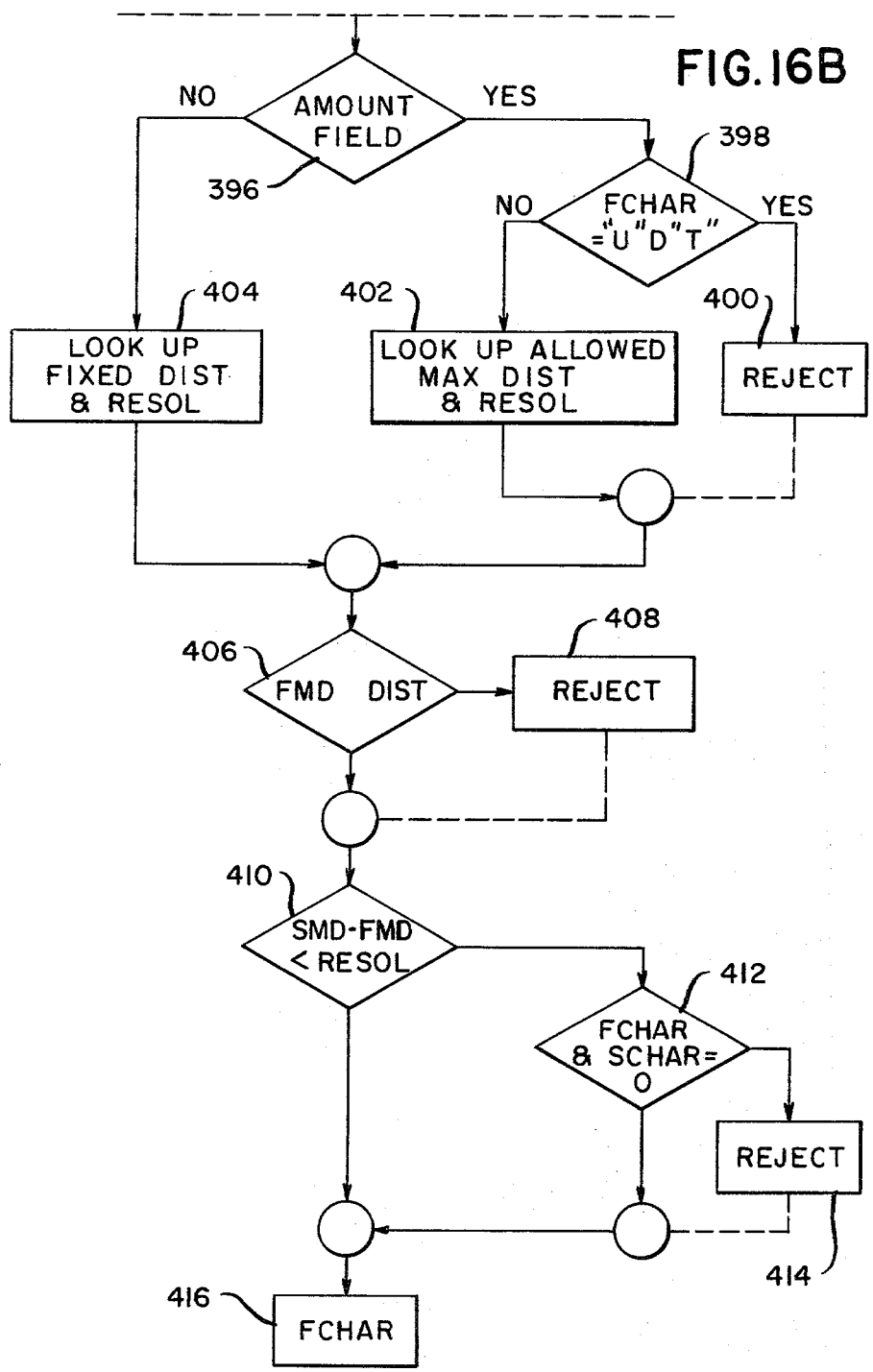

CHARACTER RECOGNITION SYSTEM

CROSS-REFERENCE TO RELATED APPLICATIONS

Magnetic Ink Character Recognition Apparatus, co-pending application Ser. No. 081,491, filed on even date herewith, invented by Robert B. Nally, James S. Akister and George Trohatos, assigned to the NCR Canada, Ltd.

BACKGROUND OF THE INVENTION

The present invention relates to the field of machine recognition of magnetically imprinted characters on a document and more particularly to a method and apparatus for identifying an input waveform representing an unknown character.

In single-gap magnetic character reading systems, a single analog input waveform is obtained by passing the characters to be sensed, normally printed on a document, beneath a magnetic read head at least as wide as the height of the characters and having a single flux gap. The signal generated by the read head is a derivative waveform representing the rate of change of magnetic flux transversing the head as the characters are scanned. Since the distribution of ink, and thus flux, associated with each different character is unique, the waveform derived for each different character uniquely identifies that character.

To simplify the timing of the waveform analysis process, the characters are provided with stylized geometric features which impart anticipatable timing characteristics to the derived waveforms. Thus, in accordance with this means for reader identification, each character of the E-13B font, for example, is divided into a predetermined number of vertical segments corresponding to a location of bar portions of the character. The E-13B characters are designed such that the distribution of ink undergoes significant change only at the boundaries between each segment. Hence, peak fluctuations in the derived waveform caused by these variations in ink distribution can occur at only predetermined times during the character scanned.

Prior character recognition systems have incorporated circuits for determining the amplitude of each of the peaks of the waveform which uniquely represent the unknown character. These peak amplitudes and their positions are normalized and then correlated with the known peak characteristics of each of the E-13B characters to identify the character read. An example of this type of recognition system may be found in the U.S. Pat. No. 4,143,356 and assigned to the present assignee. Ideally, a recognition system should be able to correctly classify an input waveform as being the character it represents regardless of waveform distortions produced by printing apparitions. In actual practice, it has been found that the characters imprinted on a document may be distorted such that portions of the symbol of the character within the symbol outline are not covered with magnetic ink. Such a distortion may occur due to imperfections of the printing device employed to imprint a character on a document. Also, the pigment of the magnetic ink used by the printing device may not have been uniformly dispersed throughout the character outline. Such poorly defined or misprinted characters produce voltage waveforms that may resemble the waveform of a character other than the character that was intended to be printed, thereby causing a misread.

It has also been found that documents become splattered with ink particles during the printing process, which particles cause corresponding spurious signals in the read head. All of these situations have caused misread operations in those recognition systems which are based solely on the correlation of peak amplitudes with a character reference standard. It is therefore an object of this invention to provide a magnetic character recognition system which overcomes the above-mentioned problems found in the prior art. It is a further object of this invention to provide a character recognition system which will correlate features of an unknown character with known characters at a relatively high rate of speed. It is a further object of this invention to provide a character recognition system which measures the "degree of risk" associated with classifying a waveform as a certain character.

SUMMARY OF THE INVENTION

These and other objects of the invention are fulfilled by providing a system for applying a plurality of templates representing a known character with features representing peak amplitudes extracted from the unknown character waveform for identifying the unknown character. Positive or negative features extracted from the unknown character waveform and their positions are compared to the maximum and minimum values defining a window stored at the same position in each of a plurality of character templates. If each of the features of the unknown character waveform fit between all the maximum and minimum values in any one of the given character templates, the unknown character is the character associated with that template. If one or more of the input features are outside the limits set in all of the templates, the distance between the feature and the corresponding maximum and minimum values of the window in the template is summed. After all the templates have been correlated with the features of the unknown character, the two minimum values found in the correlation process are then selected and evaluated to determine if a reference character can be selected given the features generated by the read head. If it is found that the difference between the two minimum values is sufficiently large, the reference character corresponding to the minimum value found in the correlation process is then selected as the character corresponding to the unknown character. The minimum value of the selected reference character is then compared with a second threshold value to insure that the magnitude of the generated data is sufficient to adequately recognize the character.

The foregoing and various other objects, advantages, and meritorious features of the present invention will be apparent from the following detailed description and appended claims when read in conjunction with the drawing, wherein like numerals identify corresponding elements.

BRIEF DESCRIPTION OF THE DRAWINGS

FIG. 1 shows a system block diagram of the invention;

FIG. 2 is a schematic diagram of a template representing the character O showing the location of the windows with respect to an unknown character waveform in which are located the features of the unknown character corresponding to the peak positions of the unknown character waveform;

FIGS. 4A-4G inclusive taken together disclose a portion of the logic circuits for establishing the values of the templates in accordance with the features of the unknown character waveform;

FIGS. 6A-6C inclusive taken together disclose another portion of the logic circuits for matching the windows of the templates with the features of the unknown character waveform;

FIG. 7 is a diagram showing the manner in which FIGS. 6A-6C inclusive are arranged with respect to each other to form the logic circuits;

FIGS. 8A-8D inclusive taken together further disclose a portion of the logic circuits for comparing the minimum distances;

FIG. 9 is a diagram showing the manner in which FIGS. 8A-8D inclusive are arranged with respect to each other to form the logic circuits;

FIG. 12 discloses an output buffer which outputs the two minimum values for each template;

FIG. 14 discloses a logic circuit for generating the clock signals used in transferring the minimum values into the character recognition processor;

FIGS. 16A and 16B inclusive taken together disclose a flowchart of the character recognition operation in which thresholds are applied to the minimum distances.

DESCRIPTION OF THE PREFERRED EMBODIMENT

Figure 3A:
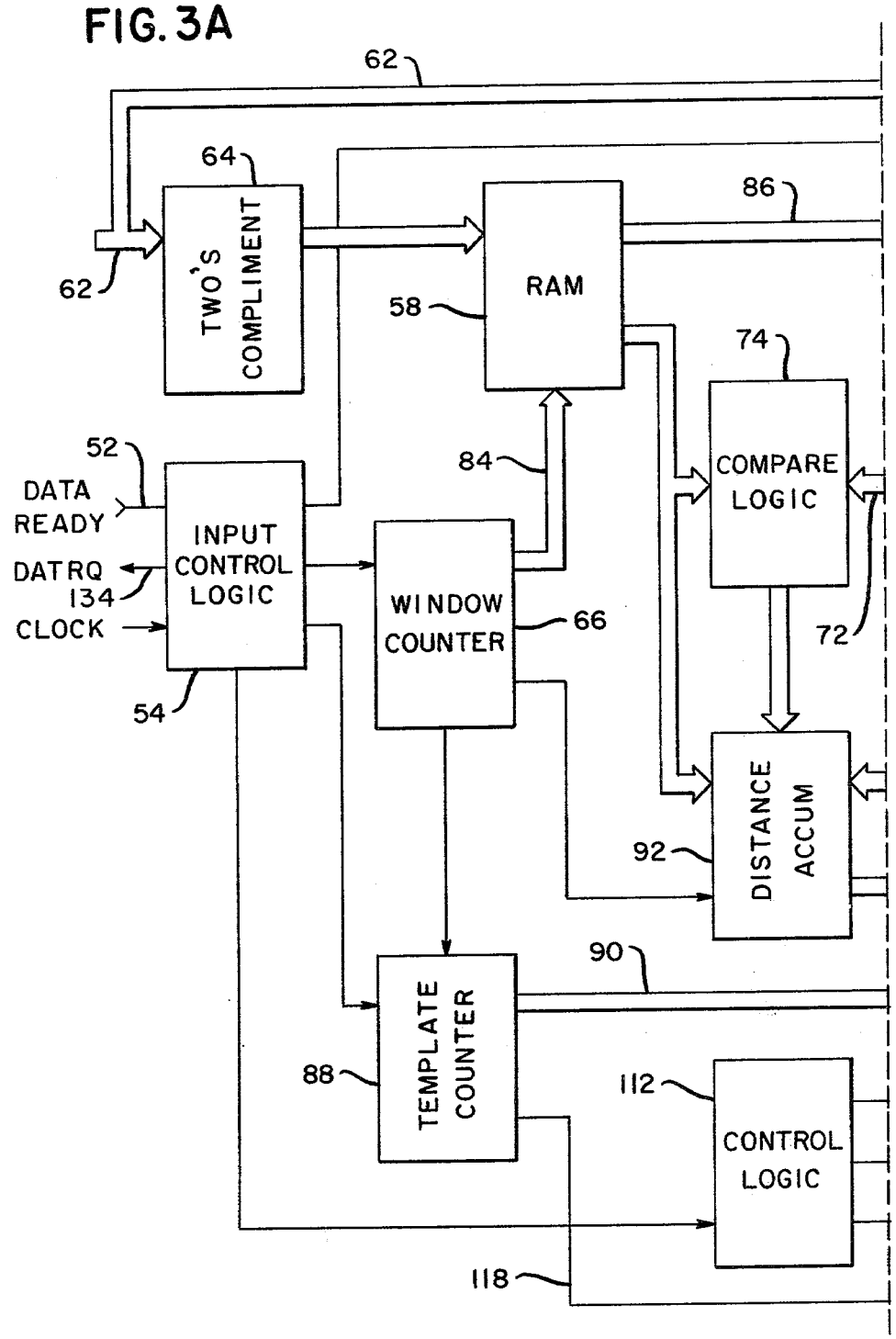
FIGS. 3A and 3B taken together disclose a block diagram of the template matching unit of the recognition system.

Referring now to FIG. 1, there is shown a block diagram of the character recognition system which includes a single-gap magnetic read head 20 positioned adjacent the path of movement of a document having characters printed thereon in magnetic ink. While the preferred characters in the present embodiment are printed in the form of the E-13B character font which is well known in the art and has been adapted by the American Bankers Association for use with banking checks in this country, it is obvious that the recognition system of the present invention can be used with any character font which results in a unique analog waveform when scanned by the read head 20. As a document moves past the read head 20 in the direction indicated by the arrow in FIG. 1, the read head will generate an analog electrical signal corresponding to the time derivative of the change in flux of the magnetized ink. The waveform is amplified by and transmitted from an amplifier 22 through an analog filter 24 for filtering out noise to an Analog/Digital (A/D) converter 26 which digitizes the analog signal and outputs a plurality of binary data each representing a sample of the analog waveform to a character start circuit 28 used in generating a threshold for determining the actual start of the waveform. The character start circuit 28 will output data to a processor 30 which establishes the start of the actual waveform using the data received from the character start circuit 28. The processor 30 will smooth out the number of samples outputted by the A/D converter 26 and extract from the reduced number of samples those samples having the maximum amplitude. The extracted samples representing the peak amplitudes which will hereinafter be referred to as features of the unknown character waveform are normalized and outputted to a template matching unit 32. The template matching unit will correlate a plurality of templates each representing a known character to the features outputted by the processor so as to classify the unknown character as one of the known characters in accordance with the matching of the corresponding template. The template matching unit 32 will also output data representing the distances between the features of the unknown character waveform and the windows of the templates where the feature is found to be outside the window of a template. This data is transmitted to a character recognition processor 34 which applies a plurality of thresholds to the distances outputted by the template matching unit 32 to recognize the unknown character. For a full disclosure of the character start circuits 28 and the operation of the processor 30, reference should be made to the previously-cited co-pending patent application Ser. No. 081,491 of Nally et al.

Referring to FIG. 2, there is shown a schematic diagram of the windows and their positions that comprise a template for the character 0. As fully disclosed in the previously-cited Nally et al. co-pending application Ser. No. 081,491, the processor 30 (FIG. 1) will output fourteen normalized peak amplitudes and their associated positions representing the unknown character. As shown in FIG. 2, each normalized feature of the unknown character waveform shown in dotted line 36 comprises the peak voltage amplitudes 38 of each of the peaks in the waveform 36. Each template of a known character comprises a series of positive windows 40 and negative windows 42. There can be a maximum of seven positive windows and seven negative windows for each template. As shown in FIG. 2, the first negative window 42 of the template is offset to the first positive window 40, thereby enabling the unknown character waveform to have eight features for use in identifying the unknown character. The templates for the characters to be recognized are essentially a set of "tolerance bands" to which the fourteen voltage amplitudes and their positions are compared to determine if a perfect match exists. As shown in FIG. 2, the peaks 38 fit exactly into the limits allowed in the 0 template and hence the waveform is classified as 0 in this case. Each template is distinct from any of the other templates. Thus, if the waveform 36 exactly matches one template, it cannot match exactly any other template. In actual experience, many of the peaks 44 and 46 (FIG. 2) will fall outside the allowed template limits. As will be described more fully hereinafter, the template matching unit 32 (FIG. 1) when matching the feature points 44 and 46 with the corresponding positive and negative windows 40 and 42 respectively, will establish distances $d_1$ and $d_2$ (FIG. 2) separating the feature points from its associated window. For each template, the template matching unit 32 (FIG. 1) adds all the distances $d_1$ and $d_2$ for each window in each template and selects the two minimum distance values $D_{M1}$ and $D_{M2}$. The processor 34 (FIG. 1) will apply control thresholds to each of the two minimum distances to select the character in accordance with the template having the lowest distance value.

Figure 3B:
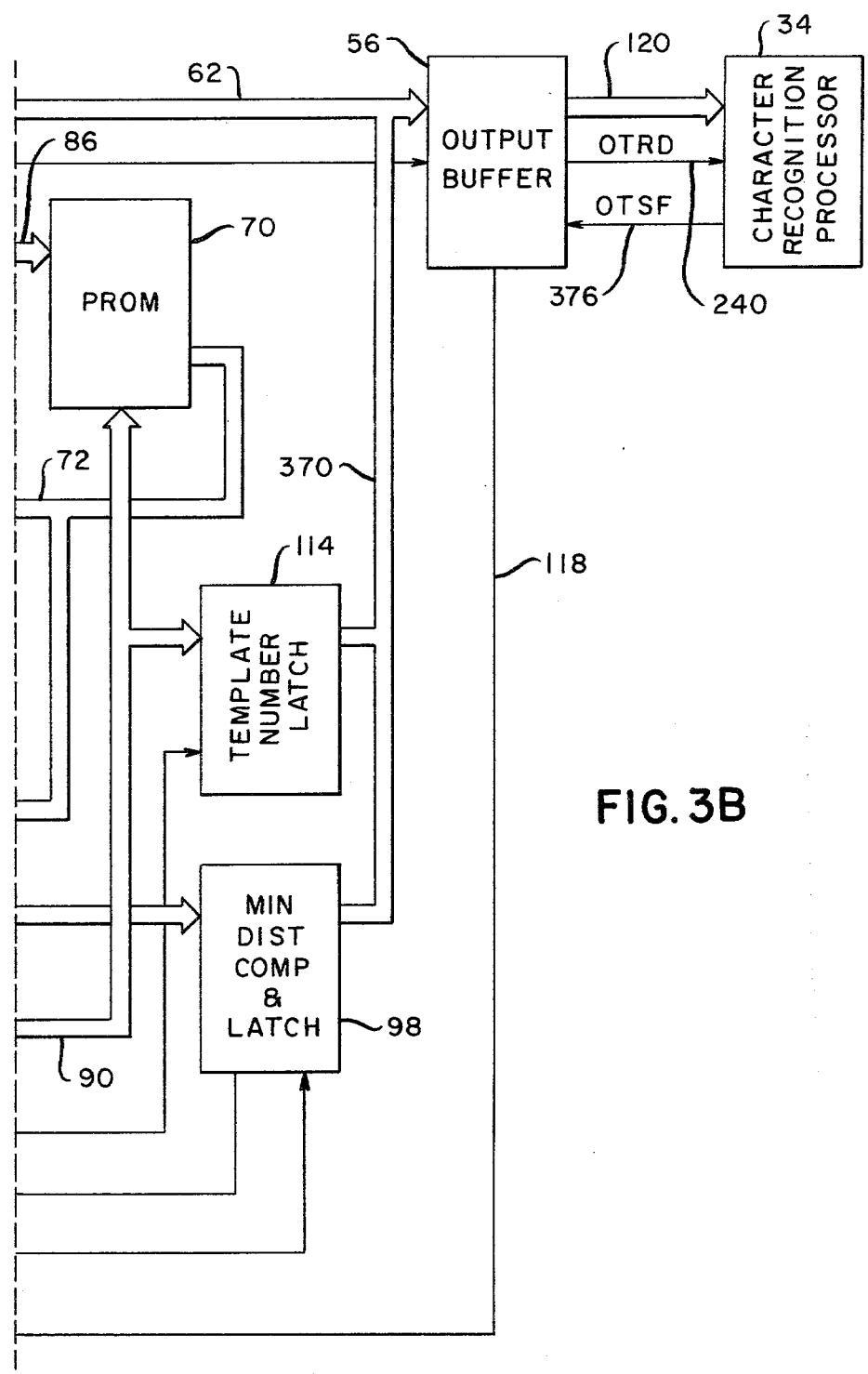
Figure 15A:
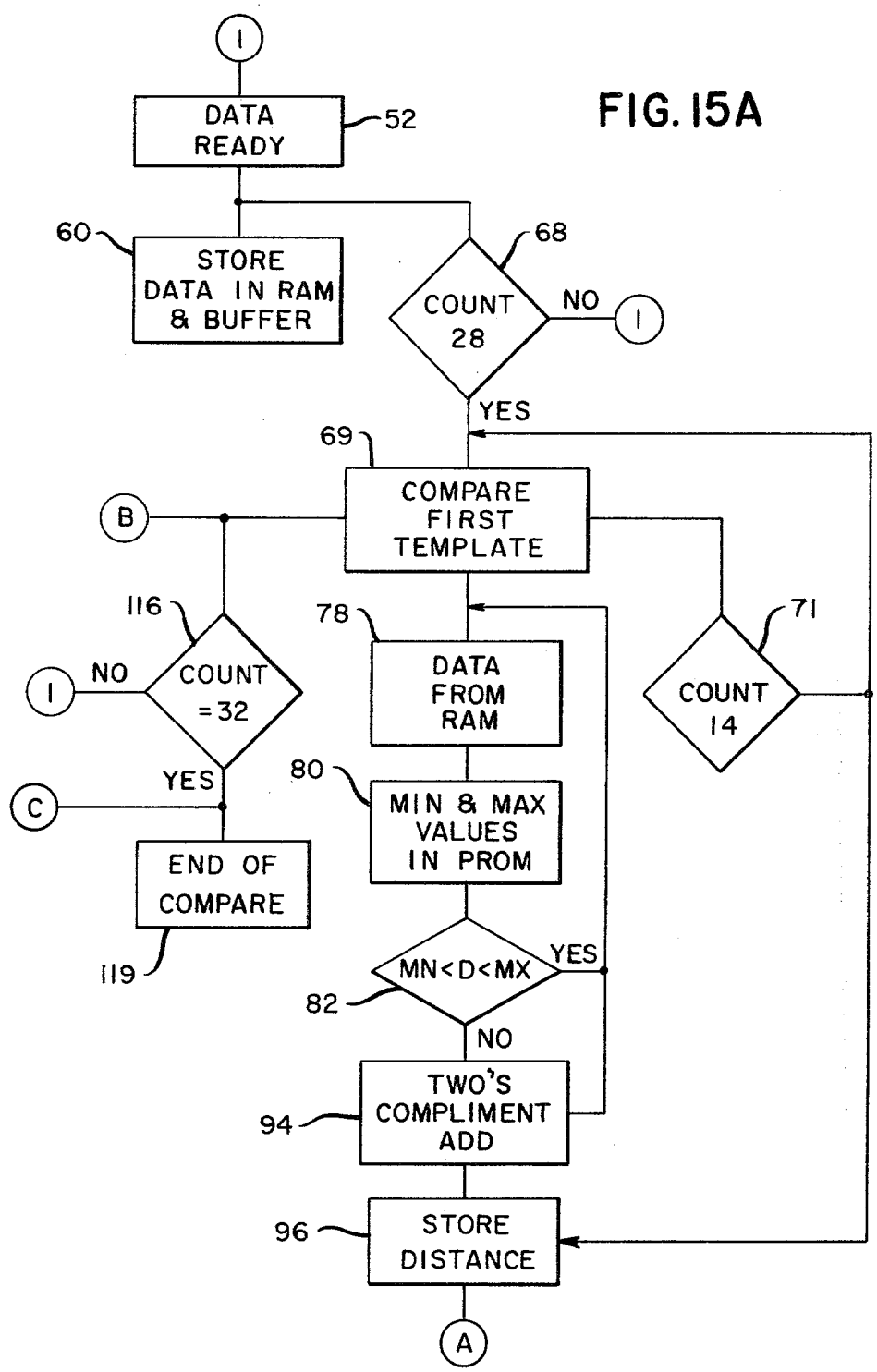
FIGS. 15A and 15B inclusive taken together disclose a flowchart of the operation of the template matching operation.
Figure 15B:
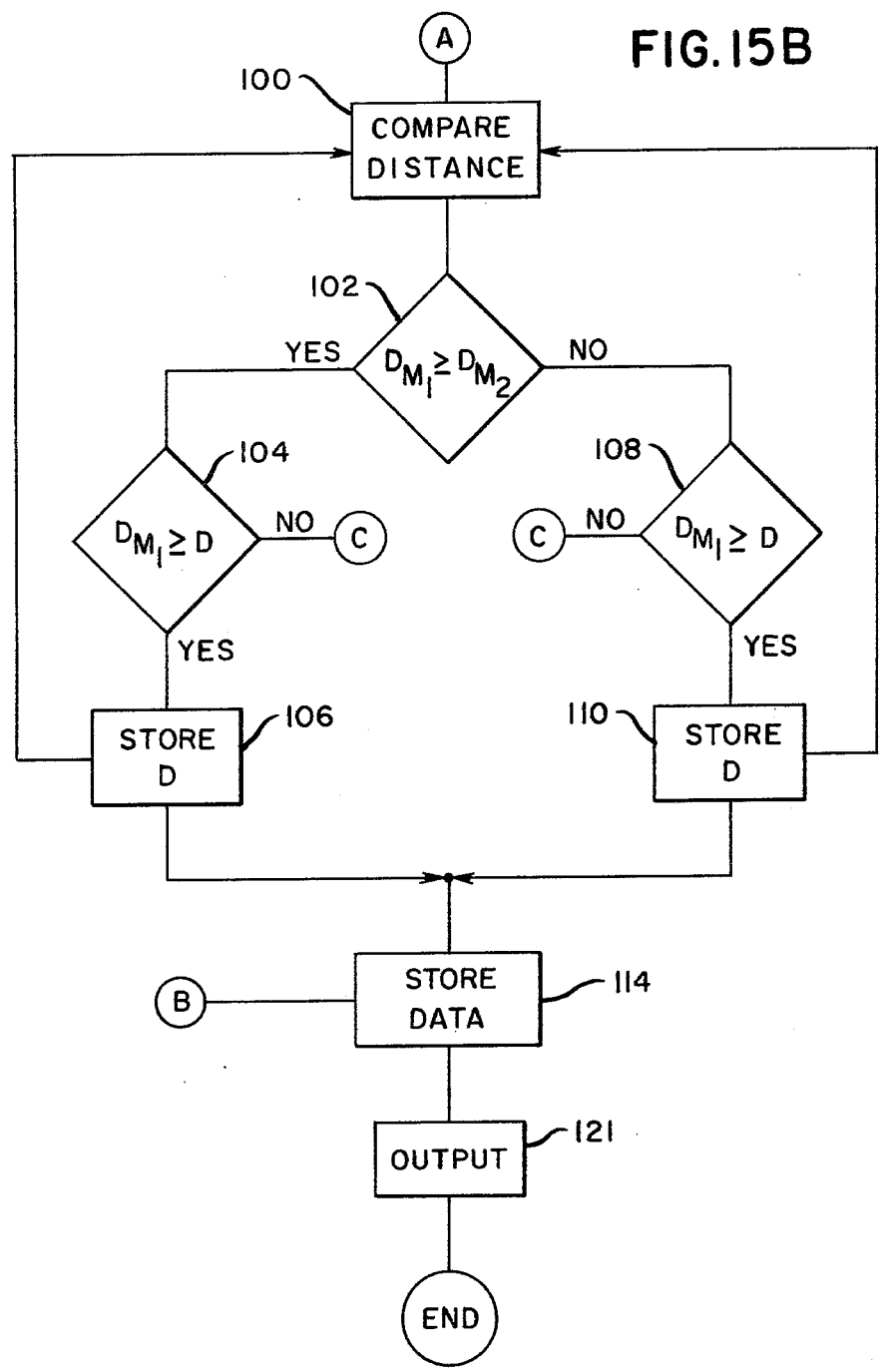

Referring now to FIGS. 3A and 3B, there is shown a block diagram of the template matching unit 32 (FIG. 1) and to FIGS. 15A and 15B inclusive which discloses a flowchart of the operation of the template matching unit. As fully disclosed in the previously-cited co-pending application Docket No. 2890 of Nally et al., the processor 30 (FIG. 1) will have stored 28 bytes of binary data comprising 14 maximum voltage amplitudes representing the peaks in each of seven positive and seven negative windows and 14 bytes of data representing the position of each of the peaks. Upon completion of processing the samples outputted by the A/D converter 26, the processor 30 will output the signal DATAREADY (block 52) (FIG. 15A) over line 52 (FIG. 3A) to the input control logic 54. The control logic 54 in response to receiving the signal DATAREADY will enable an output buffer 56 (FIG. 3B) and a RAM 58 to receive the 28 bytes of data (block 60) which are transmitted over the bus 62 from the processor 30. The data transmitted over the bus 62 is coupled to a two's complement circuit 64 which will convert all the negative bytes of data to positive bytes, the bytes then being transmitted to the RAM 58 for storage therein. The fourteen bytes representing the peaks are stored in one portion of the RAM 58 while the fourteen bytes representing the positions of the peaks are stored in a second portion of the RAM 58. Upon completion of the storage of the data in the RAM 58, the control logic 54 will initiate a counter 66 (FIG. 3A) which outputs a count to the buffer RAM 58, enabling the RAM 58 to output the fourteen bytes (block 68) representing the positions of the maximum voltage amplitudes to a PROM 70 in which is stored the minimum and maximum voltage values of each window of a plurality of templates representing known reference characters. In the present embodiment, the PROM 70 has stored therein 32 templates, each of which comprises seven positive minimum and maximum values and seven negative minimum and maximum values representing seven positive windows 40 (FIG. 2) and seven negative windows 42 respectively. Each byte representing the position of a maximum amplitude stored in the buffer RAM 58 is used as an address for the PROM 70 wherein the minimum and maximum values of each window of each template are outputted over bus 72 to a comparator circuit 74 which also receives over bus 76 the maximum amplitude whose position was used as the address for the PROM 70.

The comparator circuit 74 will initiate a comparison operation (block 69) (FIG. 15A) upon receiving each maximum amplitude (block 78) associated with one of the windows 40 and 42 (FIG. 2) stored in the buffer RAM 58 together with the minimum and maximum values (block 80) stored in the PROM 70 corresponding to the same window in one of the templates. The circuit 74 will compare the values (block 82) to determine if the peak is less than the maximum value and greater than the minimum value indicating that the peak is located within the window. If it is, the control logic 54 will increment the counter 66 whose output count transmitted over bus 84 to the RAM 58 results in the byte representing the position of the next peak being outputted over bus 86 to the PROM 70 for enabling the maximum values of the next window to be outputted over bus 72 to the comparator circuit 74 for locating the maximum amplitude point with respect to the next window. This operation will continue until all fourteen windows of a template have been compared (block 71) with the samples stored in the RAM 58, at which time a second counter 88 is incremented by one. The output count of the counter 88 is transmitted over bus 90 to the PROM 70 enabling the PROM to output the maximum and minimum values associated with the windows of the next template in response to receiving the position of the peaks from the RAM 58.

If in comparing (block 82) (FIG. 15A) the maximum amplitude with the maximum values representing the limits of the windows, it is found that the maximum amplitude is outside the window, the total of the distances $d_1$ and $d_2$ (FIG. 2) is then established by transmitting the data to a two's complement and accumulator circuit 92 (FIG. 3A) wherein the negative values of the distances are enabled to be added (block 94) to the positive values with the result D representing the total distances between the peaks and the windows being stored (block 96) in the accumulator circuit 92.

Upon completion of comparing the values stored in the RAM 58 with the template data stored in the PROM 70 representing the reference character, the accumulated distance stored in the accumulator circuit 92 is transferred to a minimum distance comparator and latch circuit 98 which will compare (block 100) (FIG. 15B) the accumulated distance of each reference character with the previous accumulated distances stored in the latch portion of the circuit 98 to establish the two templates having the two lowest or minimum accumulated distances $D_{M1}$ and $D_{M2}$. The comparator circuit 98 will first compare the first minimum distance ($D_{M1}$) with the second minimum distance ($D_{M2}$) (block 102) (FIG. 15B). If the first minimum distance is equal to or greater than the second minimum distance, the first minimum distance is then compared with the accumulated distance being presently inputted into the comparator circuit 98 (block 104) to determine the minimum distance between the two inputted values. If the first minimum distance is greater than the presently-inputted distance, the inputted distance D is then stored (block 106) in the latch portion of the circuit 98 becoming the first previous minimum distance. If the second previous minimum distance ($D_{M2}$) is greater than the first previous minimum distance ($D_{M1}$) the comparator circuit 98 will compare the second previous minimum distance ($D_{M2}$) with the inputted accumulated distance (block 108) and if it is greater than the inputted distance, the inputted distance D is then stored (block 110) in the latch portion of the circuit 98. During the operation of the comparator and latch circuit 98, signals are transmitted to a control logic unit 112 (FIG. 3A) which will store in a template number latch circuit 114 the template numbers corresponding to the two minimum distances stored in the comparator circuit 98. This data is then stored (block 114) in a FIFO storage unit (not shown) located in the output buffer circuits 56 (FIG. 3B) and the output count of the counter 88 is then checked (block 116) (FIG. 15A) to see if all templates have been compared with the data stored in the RAM 58. If the comparison operation is completed (block 121), a signal is transmitted over line 118 from the counter 88 to the output buffer control circuits 56 enabling the FIFO storage unit located in the output buffer circuits 56 to store the template numbers having the two minimum accumulated distances together with the distances stored in the latch 114 and comparator 98. The output control circuits 56 will generate the output ready signal OTRD to the processor 34 (FIG. 3B) which will raise the shift signal OTSF enabling the two minimum distances together with the template numbers to be outputted (block 121) (FIG. 15B) over bus 120 to the processor 34 (FIG. 3B) wherein the processor will apply a plurality of threshold voltage values to the minimum distances to determine if the values of the minimum distances are capable of establishing a valid reference character in a manner that will be described more fully hereinafter.

Figure 4C:
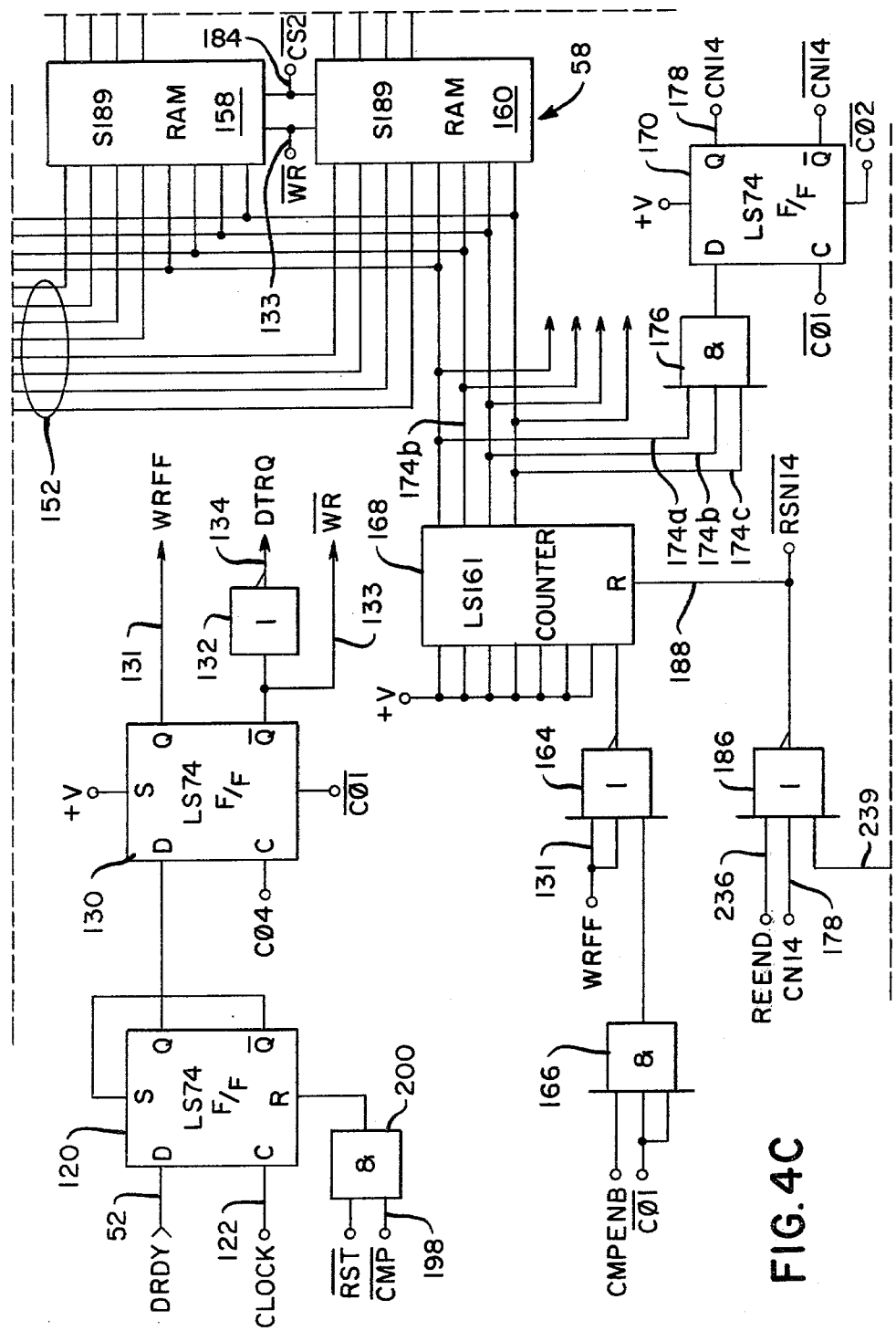
Figure 4D:
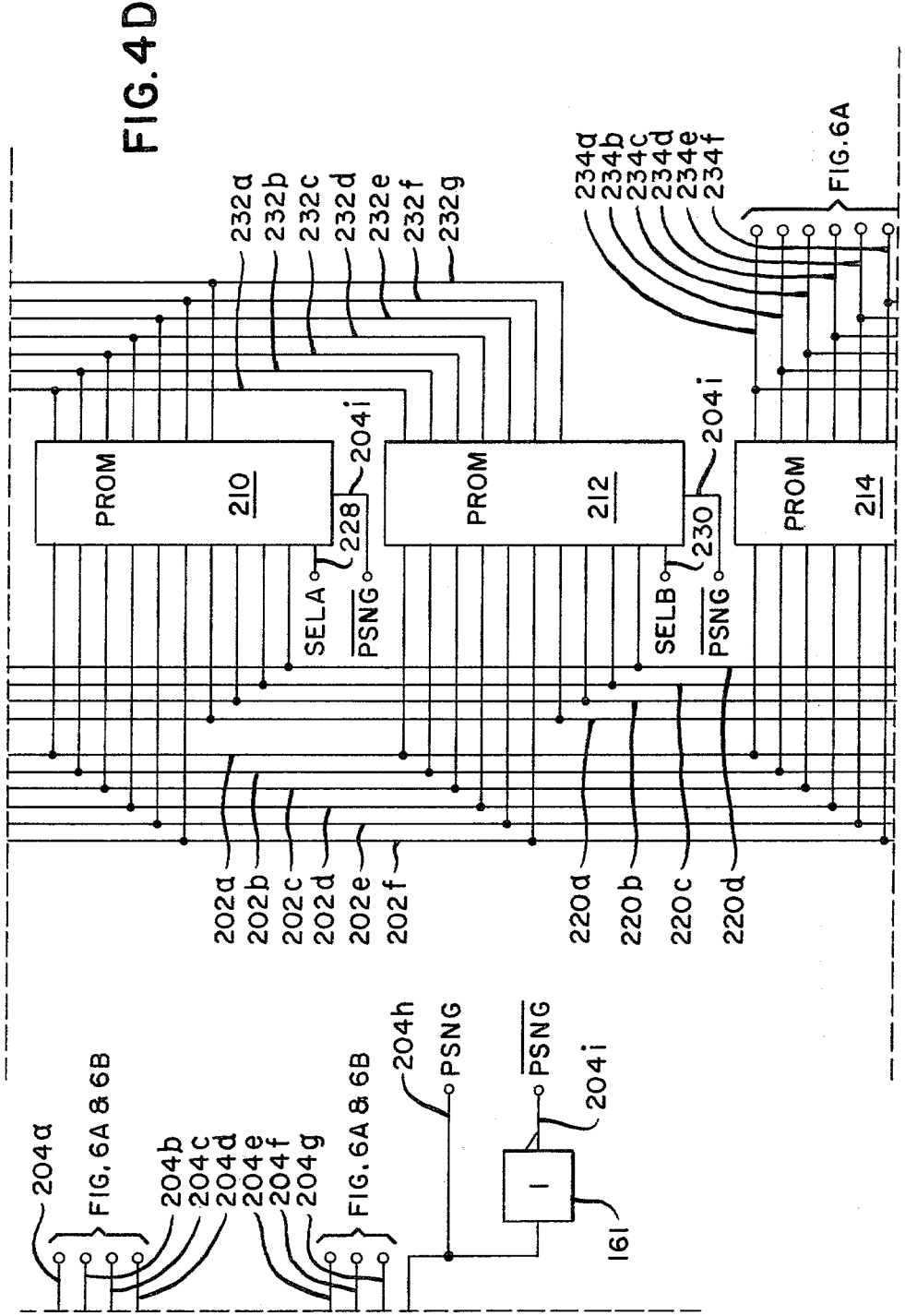
Figure 10:
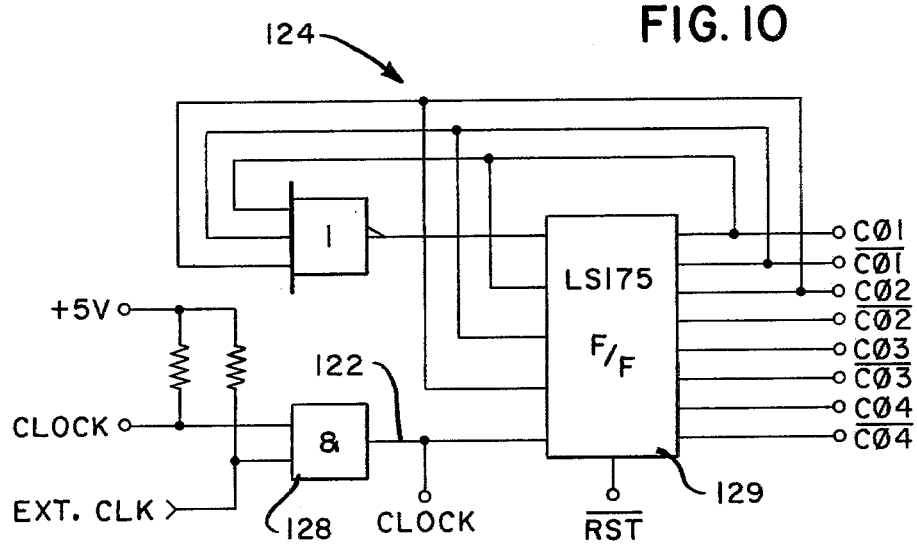
FIG. 10 discloses a logic circuit of the clock generator used in the template matching logic circuits.

Referring now to FIGS. 4A-4G inclusive, there is shown a portion of the block diagram of FIG. 6 of the template matching unit 32 (FIG. 1) in which the features of the unknown character are located with respect to the windows of the templates. As shown in FIG. 4C, the processor 30 (FIG. 1) will raise a data ready signal DRDY over line 52 to the D input of an LS74 flip-flop 120 whose clock input is connected over line 122 to a clock generator (FIG. 10) which outputs a plurality of clock signals including the signal CLCK. As shown in FIG. 10, the clock generator generally referred to by the numeral 124 comprises an LS175 quad flip-flop 126 which outputs a plurality of clock signals $C\phi 1-C\phi 4$ and $\overline{C\phi 1}-\overline{C\phi 4}$ inclusive in response to receiving a clock signal CLOCK (FIG. 3A) outputted from a 4 MHz. oscillator (not shown), which clock signal is coupled with an external clock signal (EXTCLK) through an AND gate 128 whose output clock signal CLCK is transmitted over line 122 to the flip-flop 126 and the flip-flop 120 (FIG. 4C). Upon the raising of the input signal DRDY, the Q output of the flip-flop 120 will transmit a high signal to the D input of an LS74 flip-flop 130 resulting in the appearance of a high signal WRFF at its Q output and a low signal $\overline{WR}$ appearing on its $\overline{Q}$ output. The signal $\overline{WR}$ is transmitted over line 133 to an inverter 132 and appears as the high signal data required (DTRQ) which is transmitted over line 134 to the processor 30 enabling the processor to output the 28 bytes of data representing the 14 maximum amplitudes or peaks and 14 bytes corresponding to their positions in the waveform 36 (FIG. 2). The LS74 flip-flops 120, the LS175 flip-flop and the other logic elements disclosed in the present application are commercially available from the Texas Instruments Corporation of Dallas, Texas.

As shown in FIG. 4A, each byte of data outputted from the processor 30 (FIG. 1) is transmitted over eight transmission lines 135a-135h inclusive, in which the binary bit appearing on line 135h characterizes the seven bits of data as being positive when low and negative when high. As previously described, seven bytes of the data transmitted from the processor 30 and representing the maximum amplitudes of the samples appearing in the windows 42 (FIG. 2) will be negative, while the remaining seven amplitudes will be positive. In order to logically add the voltage amplitudes, the negative amplitudes have to be converted into positive amplitudes. This is accomplished by coupling the input lines 135a-135g inclusive to a pair of LS04 inverters 136 and 138 whose output is coupled to a pair of 4-bit LS283 adders 140 and 142 which comprise the two's complement circuit. Each negative bit inputted into the inverters 136 and 138 is added to a carry appearing at the carry input 144 of the adder 140 enabling the adders 140 and 142 to output the positive values representing the negative amplitudes being inputted over lines 135a-135g. The output lines of the adders 140 and 142 and generally indicated by the numeral 146 are inputted to the B input of a pair of LS158 multiplexers which also receive at their A input the lines 135a-135g inclusive over which appear the positive amplitude data bits. As each byte of data representing the peak amplitudes is transmitted over lines 135a-135g inclusive, the data bit appearing on line 135h is transmitted to the multiplexers 148 and 150 selecting the inputs A or B depending on whether the byte of data is positive or negative. Each byte of data is outputted from the multiplexers 148 and 150 over their output lines generally indicated by the numeral 152 to a RAM generally indicated by the numeral 58 (FIGS. 4A and 4C) comprising a plurality of S189 RAM units 154, 156 (FIG. 4A) and 158 and 160 (FIG. 4C). The RAM 58 will store all 28 bytes of data transmitted from the processor 30. The RAM units 154 and 156 (FIG. 4A) will store the 14 bytes representing the positions of the maximum amplitude samples while the RAM units 158 and 160 (FIG. 4C) will store the 14 positive values representing the maximum amplitudes of the unknown character waveform.

As described previously, upon the raising of the signal DRDY (FIG. 4C) by the processor 30 (FIG. 1), the flip-flop 130 will output the high signal WRFF over line 131 to one input of a NOR gate 164 (FIG. 4C) which receives a low signal from a NAND gate 166 due to an input compare enable signal CMPENB being low at this time. The NOR gate 164 will output a low signal to a LS161 counter 168 which will count the number of bytes being transmitted over lines 135a-135h inclusive for correlation with a window. The output count of the counter 168 controls the operation of a pair of LS74 flip-flops 170 (FIG. 4C) and 172 (FIG. 4E) enabling the RAM units 154 and 156 to store the first fourteen bytes of data being transmitted over lines 135a-135h inclusive representing the positions of the maximum voltage amplitudes in a manner that will now be described.

Figure 4E:
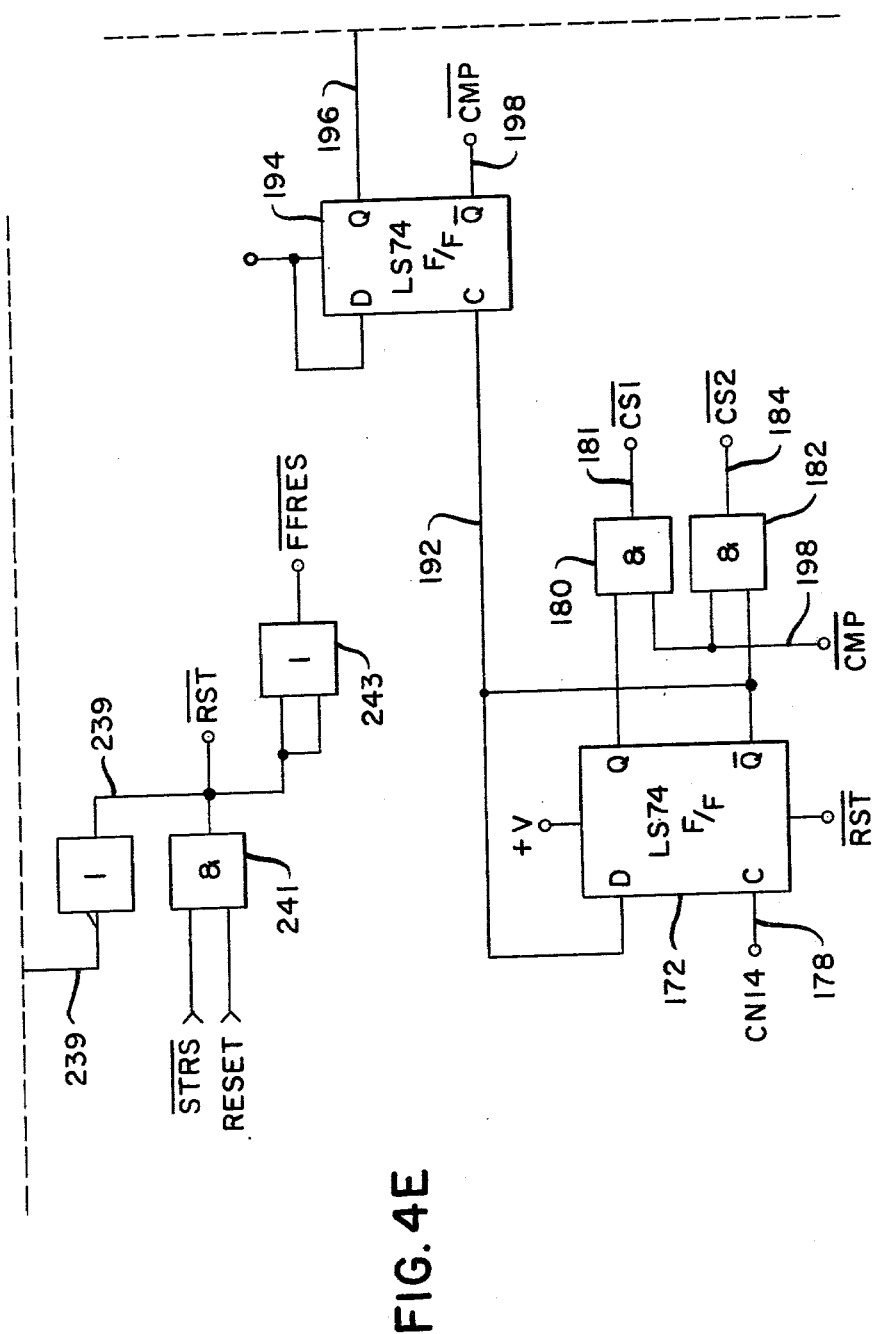

The RAM units 154 and 156 are enabled by the signal $\overline{CS_1}$ while the RAM units 158 and 160 (FIG. 4C) are enabled by the signal $\overline{CS_2}$. As shown in FIG. 4E, both the signals $\overline{CS_1}$ and $\overline{CS_2}$ are controlled by the state of the flip-flop 172. During the time the output count of the counter 168 is counting through the first fourteen counts, the binary bits appearing on the output lines 174a-174c inclusive will enable an AND gate 176 to output a low signal to the D input of the flip-flop 170 resulting in the Q output signal CN14 being low. This signal is transmitted over line 178 to the clock input of the flip-flop 172 (FIG. 4E) resulting in a low signal appearing at the Q output of the flip-flop. This signal is transmitted to the AND gate 180 on whose other input appears the low signal $\overline{CMP}$. This condition will enable the AND gate 180 to output the low signal $\overline{CS1}$ to the RAM units 154 and 156 (FIG. 4A) enabling the RAM units to store the first fourteen bytes of data representing the position of the maximum amplitude. Upon the output count of the counter 168 reaching the count of fourteen, a high signal will appear on each of the output lines 174a-174c enabling the AND gate 176 to output a high signal to the D input of the flip-flop 170 enabling the Q output signal CN14 to go high, while the $\overline{Q}$ output signal $\overline{CN14}$ will go low. The raising of the signal CN14 over line 178 will clock the flip-flop 172 enabling the Q output signal to go high while the $\overline{Q}$ output signals go low, the latter signal enabling an AND gate 182 to output the low signal CS2 which signal is transmitted over line 184 to the RAM units 158 and 160 enabling the RAM units to store the data appearing on the output lines 152. At this time, the output signal CS1 will go high, thereby disabling the RAM units 154 and 156 from accepting any more data for storage appearing on the input lines 152.

The raising of the signal CN14 upon the output count of the counter 168 reaching 14, over line 178 to the NOR gate 186 (FIG. 4C) enables the NOR gate 186 to output a low reset signal RSN14 over line 188 to the reset input of the counter 168 resetting the counter. At this time the counter 168 will output counts over lines 174a–174d inclusive to the RAM units 154–160 inclusive enabling the bytes of data appearing on the input lines 152 to be loaded into the RAM units 158 and 160 in a manner that is well-known in the art. Upon completion of the second fourteen counts by the counter 168, the 28 bytes of data will be stored in the RAM units 154–160 (FIGS. 4A and 4C inclusive).

Figure 4F:
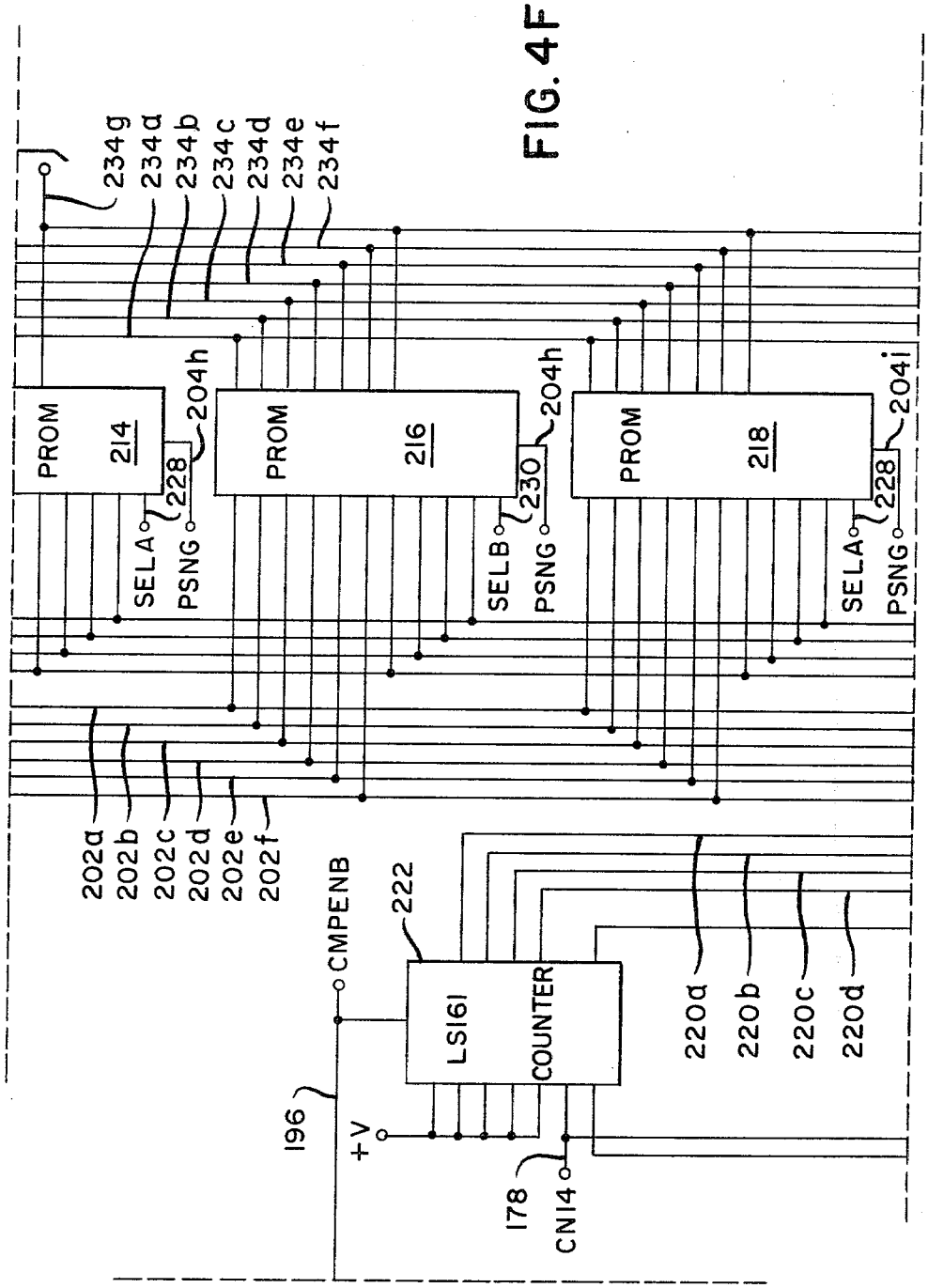
Figure 4G:
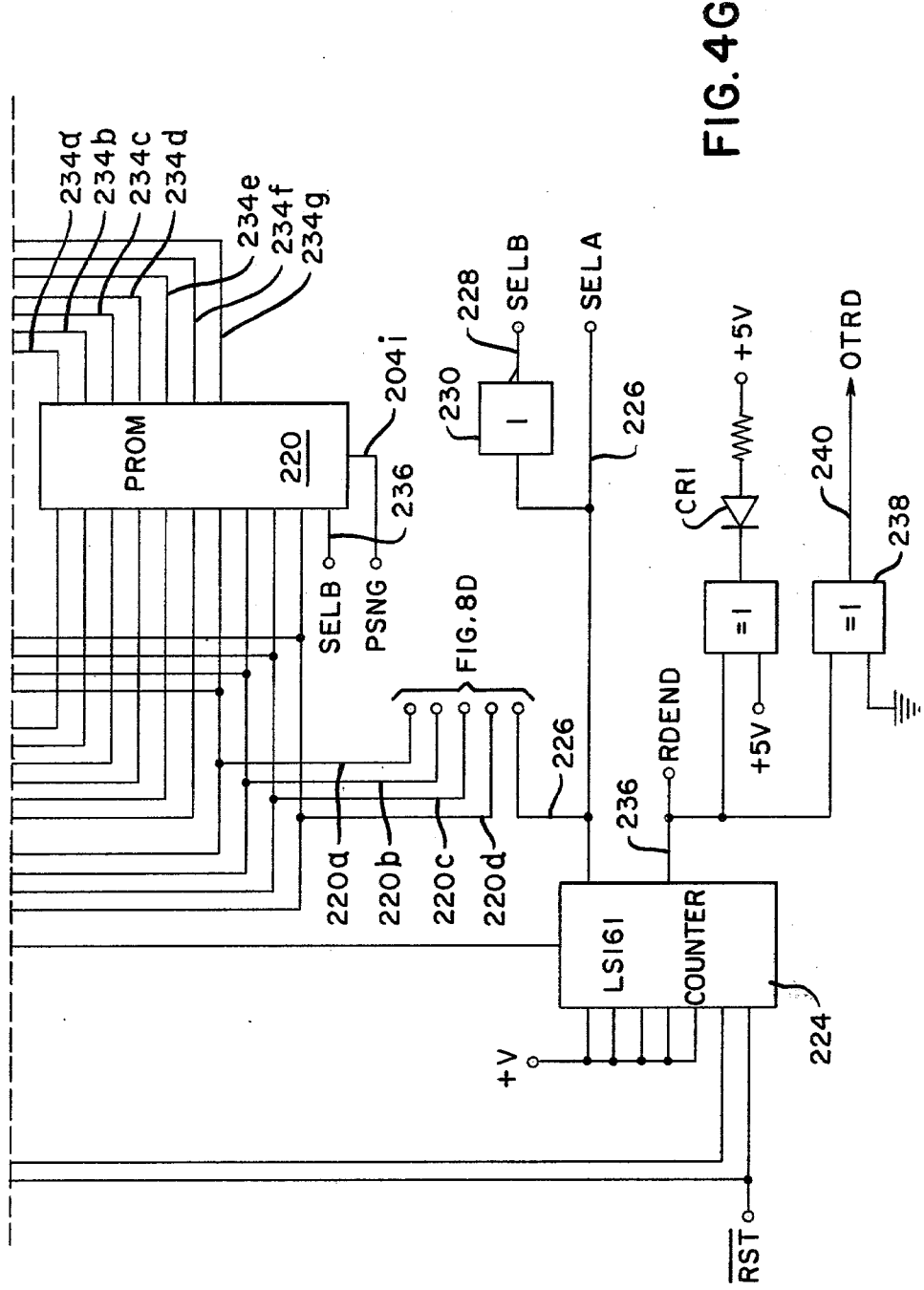
Figure 5:
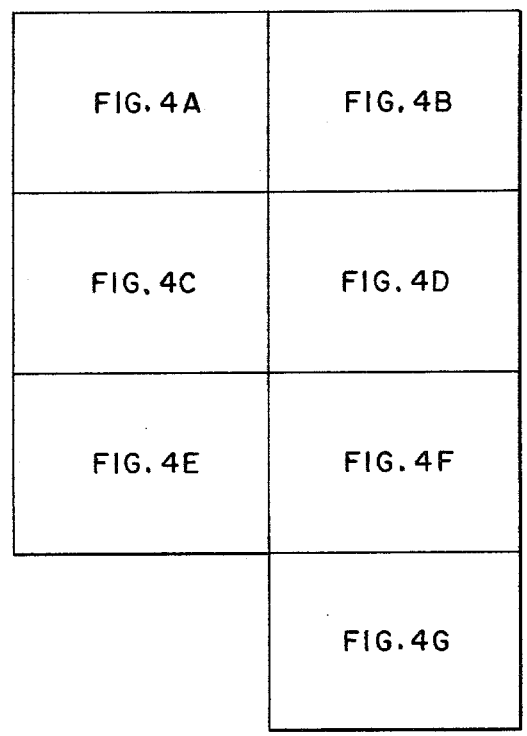
FIG. 5 is a diagram showing the manner in which FIGS. 4A-4G inclusive are arranged with respect to each other to form the logic circuits.

As described previously, upon the raising of the data ready signal DRDY over line 52 (FIG. 4C), which occurs each time the processor 30 (FIG. 1) has processed one character, the Q output of the flip-flop 130 will go high, which signal WRFF enables the NOR gate 164 to go low, thereby incrementing the counter by one. Since the flip-flop 130 is now latched due to the signal DRDY being high during the time the data is transmitted from the processor to the RAM buffers 58, the signal WRFF will cycle in response to the generation of the clock signal C$\phi$4 which appears at the clock input of the flip-flop 130. For this arrangement, the counter 168 will be incremented to count up to 14, enabling the first 14 bytes representing the positions of the maximum amplitudes to be loaded into the RAM units 154 and 156 in the manner described previously. The counter 168 is reset by the generation of the signal CN14 to initiate the second fourteen count operation at the end of which the signal CN14 is again raised. The high signal CN14 is transmitted over line 178 to the clock input of the flip-flop 172 (FIG. 4E) resulting in a high signal appearing at the $\overline{Q}$ output, which signal is transmitted over line 192 to the clock input of a LS74 flip-flop 194 (FIG. 4E). The clocking of the flip-flop 194 results in the appearance of the high compare enable signal CMPENB on the Q output line 196 and the low signal CMP appearing on the $\overline{Q}$ output line 198 (FIGS. 4E and 4F). The low signal $\overline{CMP}$ is transmitted over line 198 to one input of the AND gate 200 (FIG. 4C) whose other input signal $\overline{RST}$ is high at this time, thereby enabling the AND gate 200 to output a low signal to the reset input of the flip-flop 120 thereby resetting the flip-flop and stopping the input operation of the counter 168. In addition, the signal $\overline{CMP}$ is transmitted over line 198 to the inputs of the AND gates 180 and 182 (FIG. 4E) resulting in both the output signals $\overline{CS1}$ and CS2 going low, which signals are transmitted to the RAM units 154–160 (FIGS. 4A and 4C) over lines 181 and 184 enabling data to be outputted from the RAM unit. As described previously, the data bytes representing the positions of the maximum amplitudes are used as addresses for input to a PROM unit 70 (FIG. 3) which stores the template data comprising the maximum and minimum values which are to be compared with the amplitude values for correlation therewith.

The resetting of the flip-flop 120 (FIG. 4C) stops the operation of the inputting of the data from the processor until the signal DRDY goes high, which occurs when the processor 30 has processed a new character waveform. The resetting of the flip-flop 120 results in the resetting of the flip-flop 130 resulting in the Q output signal WRFF going low. As described previously, the signal WRFF is transmitted over line 131 to one input of the NOR gate 164 (FIG. 4C) whose other input is coupled to the output of the NAND gate 166 on whose input appears the compare enable signal CMPENB which at this time is high as a result of the clocking of the flip-flop 194 (FIG. 4E) by the high signal appearing on line 192. Upon the application of the high signal CMPENB to the AND gate 166, a high signal will occur on its output upon the clock signal $\overline{C\phi 1}$ going high which signal is transmitted to the NOR gate 164 resulting in the outputting of a low signal to the counter 168 incrementing the counter by 1. It will be seen that every time the clock signal $\overline{C\phi 1}$ goes high, the counter 168 will be incremented by one, which output count is transmitted over lines 174a–174d inclusive to the RAM units 154–160 inclusive (FIGS. 4A and 4C). Upon the occurrence of each count on the output lines 174a–174d inclusive, six bits of data representing the position of a maximum amplitude will appear on the output lines 202a–202f inclusive of the RAM units 154 and 156 (FIGS. 4A and 4B) while eight bis of data will appear on the output lines 204a–204h inclusive (FIGS. 4C and 4D) of the RAM units 158 and 160 representing the corresponding maximum amplitude. The data bit appearing on line 204h represents the sign of the amplitude values. Thus, if the peak amplitude value was positive, the signal PSNG will be low, while if the amplitude value was negative, the output signal $\overline{PSNG}$ of the inverter 161 (FIG. 4D) will be low. As shown in FIGS. 4B, 4D, 4F and 4G, the PROM 70 (FIG. 3) containing the template data consists of eight #2758 PROM units 206–220 inclusive. As shown, the PROM units 206, 208, 214, and 216 contain the minimum and maximum values associated with the positive windows 40 (FIG. 2) while the PROM units 210, 212, 218 and 220 store the minimum/maximum values associated with the negative windows 42 (FIG. 2). The six binary bits appearing on lines 202a–202f inclusive (FIG. 4D) will appear at the inputs of each of the PROM units 206–220 inclusive. The particular template is selected by a four bit count appearing on the output lines 220a–220d inclusive (FIG. 4F) of a counter 222 which is incremented by the raising of the signal CN14 over line 178 which occurs upon the counter 168 reaching the count of 14 in the manner described previously. The counter 222 is coupled to a second LS161 counter 224 (FIG. 4G) which outputs over line 226 a PROM enable signal SELA and the PROM enable signal SELB over line 228 and transmitted through an inverter 230. As shown in FIGS. 4B, 4D, 4F and 4G, one of the PROMS will be selected by the signals SELA, SELB, PSNG, and $\overline{PSNG}$ together with the output count of the counter 222 appearing on lines 220a–220b inclusive to output over the output lines 232a–232g inclusive (FIG. 4B) the minimum value of the window. In a similar manner, the maximum value will appear on the output lines 234a–234b inclusive (FIGS. 4D and 4F) for transmission to the comparator circuits 74 (FIG. 3) as will be described more fully hereinafter.

Upon the counters 222 (FIG. 4F) and 224 (FIG. 4G) reaching a count equal to the last template, the signal RDEND appearing on the output line 236 will be transmitted to one input of the NOR gate 186 (FIG. 4C) and also to an EXCLUSIVE OR gate 238 (FIG. 4G) which outputs a ready signal OTRD over line 240 signalling the comparator circuits 74 (FIG. 3) that data representing the maximum and minimum values are present for transmission to the comparator circuits. The transmission of the signal RDEND to the NOR gate 186 (FIG.

4C) enables the NOR gate to output a low reset signal RSM14 over line 188 for resetting the counter 168. The processor 30 will output a low reset signal $\overline{STRS}$ (FIG. 4E) which signal is coupled to an AND gate 241 which also receives a reset signal $\overline{RESET}$ which is transmitted from the comparator circuits to reset the inputs FIFO in a manner to be described more fully hereinafter. The NAND gate 241 will output the reset signals $\overline{RST}$ over line 239 and $\overline{FFRES}$ outputted from the inverter 243 which signals are used to reset the logic circuits in a manner that is well-known in the art.

Figure 6C:
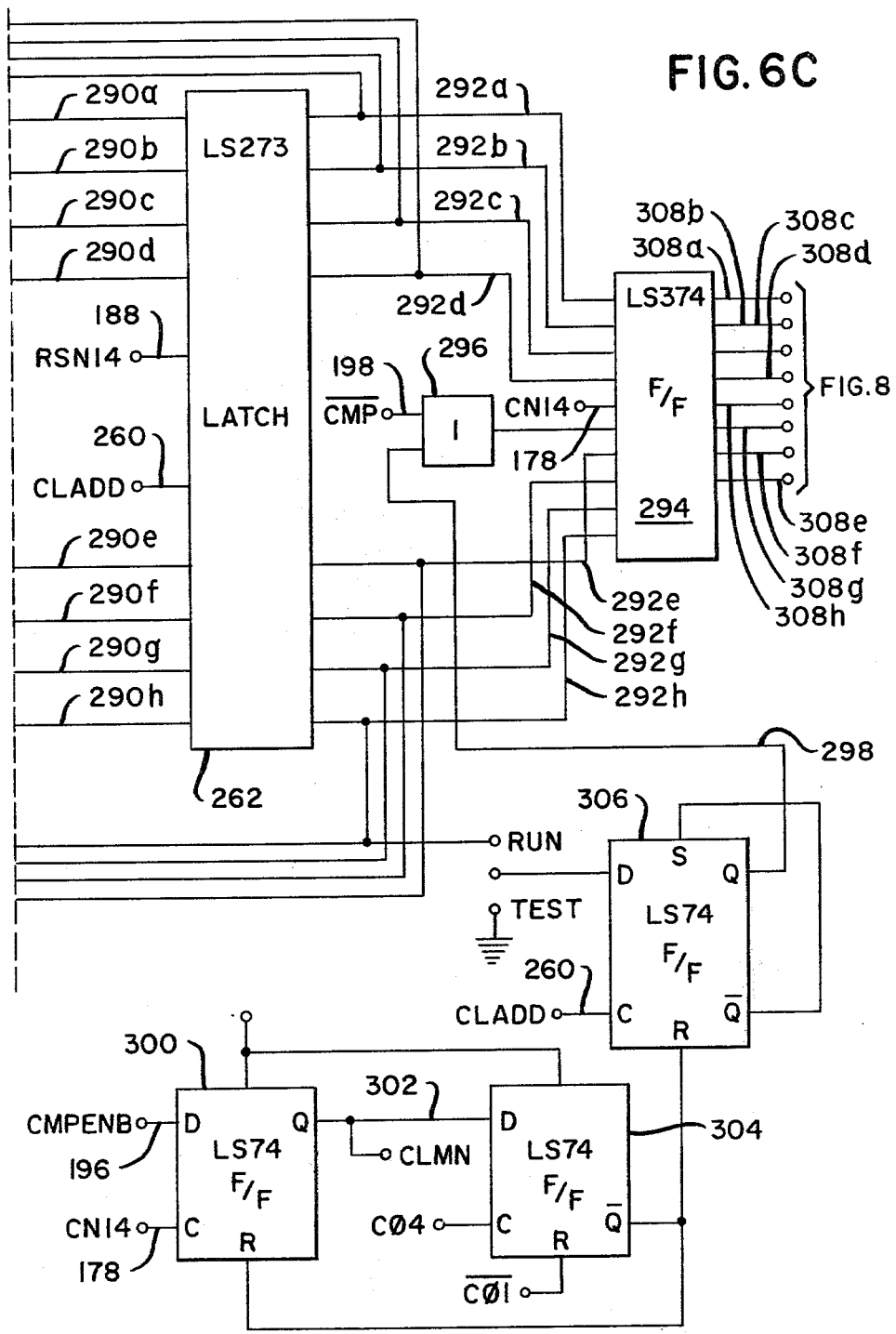

Referring now to FIGS. 6A–6C inclusive, there is shown the logic circuits for comparing the maximum and minimum values of each template with the peak amplitudes of the unknown character waveform and for accumulating the distances between the peak amplitudes and the maximum and minimum values of the templates. As shown in FIG. 6A, the data bits representing the peak amplitude outputted over lines 204a–204g of the RAM units 158 and 160 (FIG. 4C) are inputted into the A inputs of a plurality of comparators 242–248 inclusive. The minimum values of each window corresponding to the position of the peak amplitude as represented by data bits appearing over lines 232a–232g from the PROMS 206–220 inclusive (FIG. 4B) are inputted into the $B_{min}$ inputs of the comparators 242 and 244 while the data bits representing the maximum value of the window are outputted over lines 234a–234g of the PROMS 206–220 inclusive (FIGS. 4D and 4F) to the $B_{max}$ inputs of the comparators 246 and 248 enabling the comparators to locate the peak amplitude with respect to the window represented by the maximum and minimum values. It will be seen that there are three conditions which can occur as a result of this comparison operation. If the peak amplitude inputted at the A inputs is greater than the minimum values and is also less than the maximum values, the peak amplitude is located within the window and no distance accumulation is necessary. If the peak amplitude is less than the minimum values, the peak amplitude is required to be subtracted from the minimum values to arrive at the distance $d_2$ (FIG. 2) while if the peak amplitude is greater than the maximum value, the maximum value has to be subtracted from the peak amplitude to arrive at the distance $d_1$ (FIG. 2). As the distances $d_1$ and $d_2$ are generated, they are accumulated as each window is compared with a peak amplitude such that after fourteen comparison operations representing the template of a known reference character, the value stored in the accumulator represents the total distance for that template.

Upon the inputting of the values into the comparator 242–248 inclusive, if the peak amplitude is greater than the minimum value of the window, a high signal will appear on line 250 from the comparator 244, which signal is transmitted to one input of an EXCLUSIVE OR gate 252. If the peak amplitude is less than the maximum value of the window, a high signal will appear on line 254 of comparator 248, which signal is transmitted to the other input of the EXCLUSIVE OR gate 252 enabling the gate to output the low signal $\overline{NEQ}$ over line 256 to the D input of an LS74 flip-flop 258. A low signal appearing at the D input of the flip-flop 258 will result in the Q output signal clock accumulator (CLADD) which signal is transmitted over line 260 to a latch 262 (FIG. 6C) and disabling the latch from latching the value representing the distances generated from a logic circuit which will now be described.

If the peak amplitude value is greater than the maximum value of the window, a high signal will appear on line 264, which signal is transmitted to a number of circuits which will generate the distances $d_1$ and $d_2$ (FIG. 2) in a manner that will now be described. As shown in FIG. 6B, the peak amplitude values are transmitted over lines 204a–204g to the A inputs of a pair of LS158 multiplexers 266 and 268 on whose output lines 270a–270g inclusive will appear the inverted values of the selected input values. The multiplexers 266 and 268 also receive the maximum values of the window over lines 234a–234g inclusive at its $B_{max}$ inputs. The output lines 270a–270g inclusive of the multiplexers 266 and 268 are inputted into the A inputs of a pair of LS283 adders 272 and 274. The value appearing on the lines 270a–270g inclusive represents the distance between the maximum value being inputted at the $B_{max}$ inputs of the multiplexer and the peak amplitude values appearing at the A inputs of the multiplexers 266 and 268 which have a negative sign. By inverting the negative value and inputting the value into the adders 272 and 274, the adders 272 and 274 will perform a twos complement operation by adding one to the value of a high carry signal appearing on line 276.

The peak amplitude values appearing on lines 204a–204g inclusive are inputted into a pair of LS157 multiplexers 278 and 280 which also receives at its A input the minimum values of the window transmitted over lines 232a–232g. The output lines 282a–282g inclusive are inputted into the B input of the adders 272 and 274.

If a high signal appears on line 264 (FIGS. 6A and 6B) indicating that the value of the peak amplitude (A) is greater than the maximum value ($B_{max}$) of the window, the signal will be transmitted to the control input of the multiplexers 266–280 inclusive (FIG. 6B) enabling the multiplexers 266 and 268 to output a value representing the inverted maximum value ($1/B_{max}$) over lines 270a–270g inclusive to the A input of the adders 272 and 274. The high signal being transmitted over line 264 will enable the value of the peak amplitudes to be outputted over the output lines 282a–282g inclusive of the multiplexers 278 and 280 into the B input of the adders 272 and 274. The adders 272 and 274 will subtract the maximum value from the peak amplitudes by performing a two's complement on the inverted value ($1/B_{max}$) using the carry signal appearing on line 276 and adding the resulting value to the value of the peak amplitude. This value, representing the distance $d_1$ (FIG. 2), is outputted over lines 284a–284g inclusive to a pair of LS283 adders 286 and 288 whose output lines 290a–290g inclusive are coupled to an LS273 latch 262 (FIG. 6C). The output lines 292a–292g of the latch 262 are coupled to the A inputs of the adders 286 and 288 and also to an LS374 flip-flop 294 for storing the output of the latch 262.

If the peak amplitude (A) is less than the minimum value ($B_{min}$) of the window, the signal appearing on line 264 will be low, enabling the adders 272 and 274 to subtract the value of the peak amplitude appearing on lines 270a–270g inclusive from the minimum value appearing on the output lines 282a–282g of the multiplexers 278 and 280. The value of the distance being outputted over the lines 284a–284g of the adders 272 and 274 are added to the output of the latch 262 and the adders 286 and 288, which value is then outputted over lines 290a–290g inclusive to the latch 262. As each peak amplitude is compared with the minimin/maximum values representing the windows of the template, the distances will be added in adders 286 and 288 and will appear on the output of the latch 262 for transmission over lines 292a–292g inclusive to the flip-flop 294 for storage therein. At the completion of comparing all fourteen values of the peak amplitudes with the windows of the template, the counter 168 (FIG. 4C) will enable the flip-flop 170 to output the clock signal CN14 over line 178 to the flip-flop 294 (FIG. 6C) enabling the flip-flop to store the output value appearing on the output lines 292a–292g inclusive of the latch 262 representing the total accumulated distances for the template. The flip-flop 294 is reset by the generation of the signal $\overline{CMP}$ which goes low at the end of the counter 168 reaching a count of 28 in a manner described previously. The signal CMP is transmitted over line 198 into a NOR gate 296 which also receives over its input line 298 a reset signal generated upon the occurrence of the signal CN14 going high which clocks a flip-flop 300 on whose D input appears the compare enable signal CMPENB. The clocking of the flip-flop 300 will output the high signal CLMN over its Q output line 302 which is inputted into a second flip-flop 304 whose $\overline{Q}$ output will reset a flip-flop 306 enabling a high signal to occur over line 298 upon the rising of the latch clock signal CLADD appearing over line 260. The latch 262 is reset upon the generation of the reset signal RSN14 appearing on the output line 188 of the NOR gate 186 (FIG. 4C) in the manner described previously.

Figure 8A:
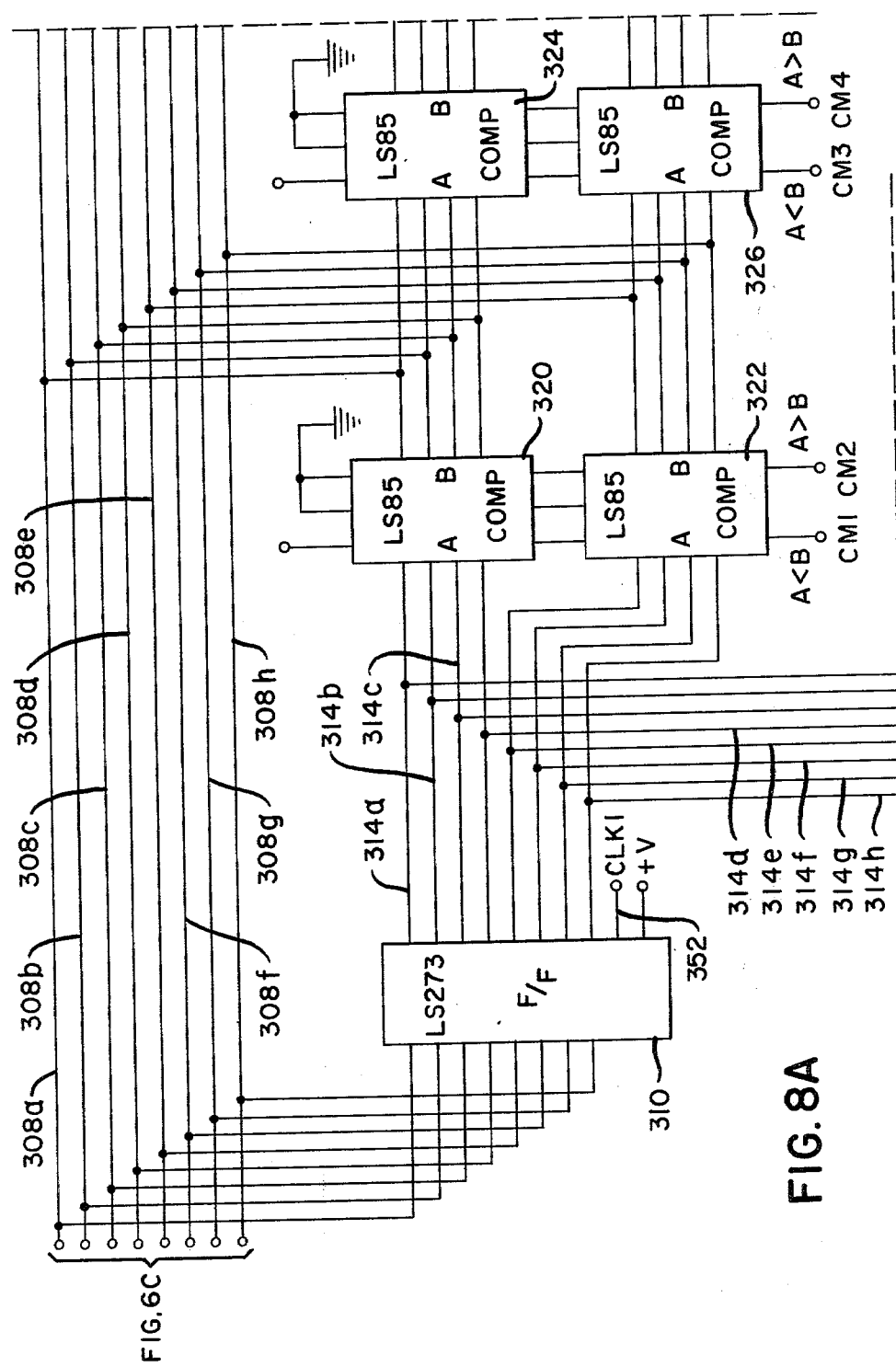
Figure 8B:
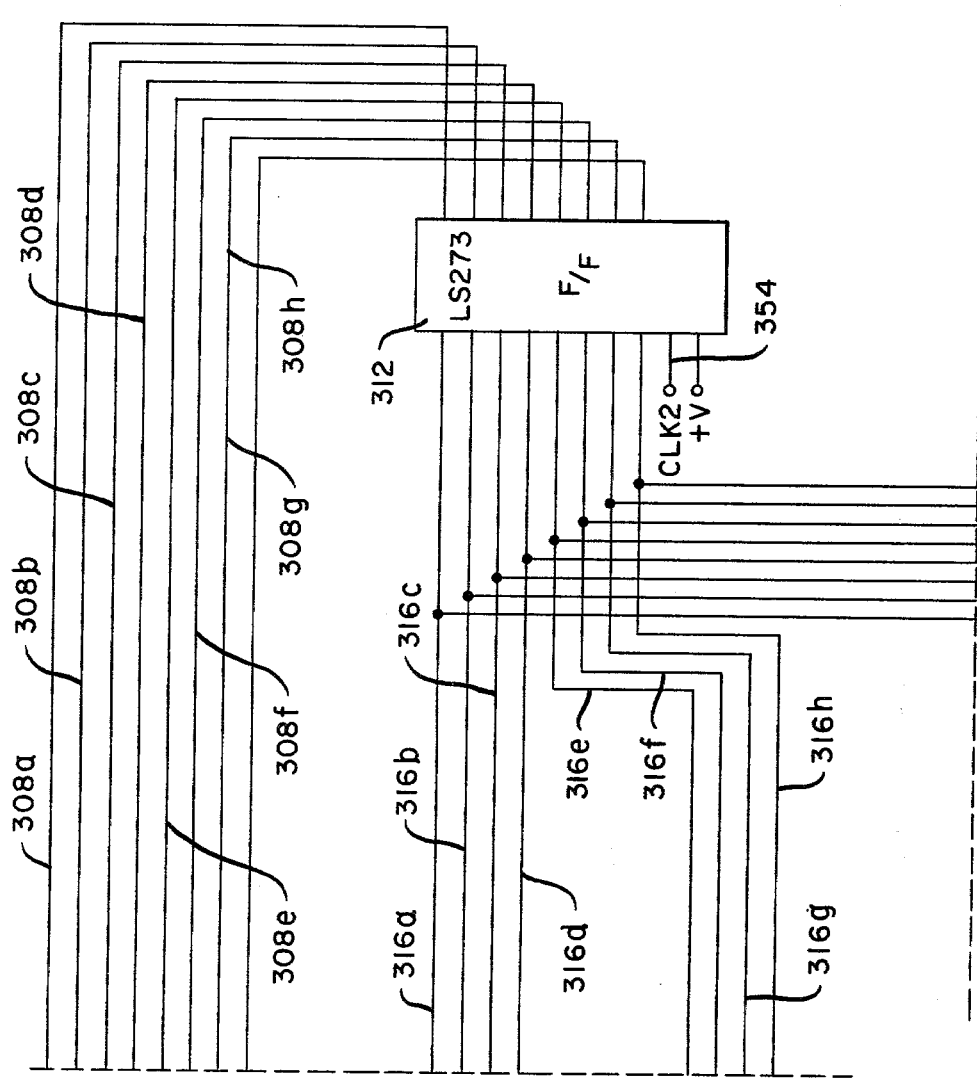
Figure 8C:
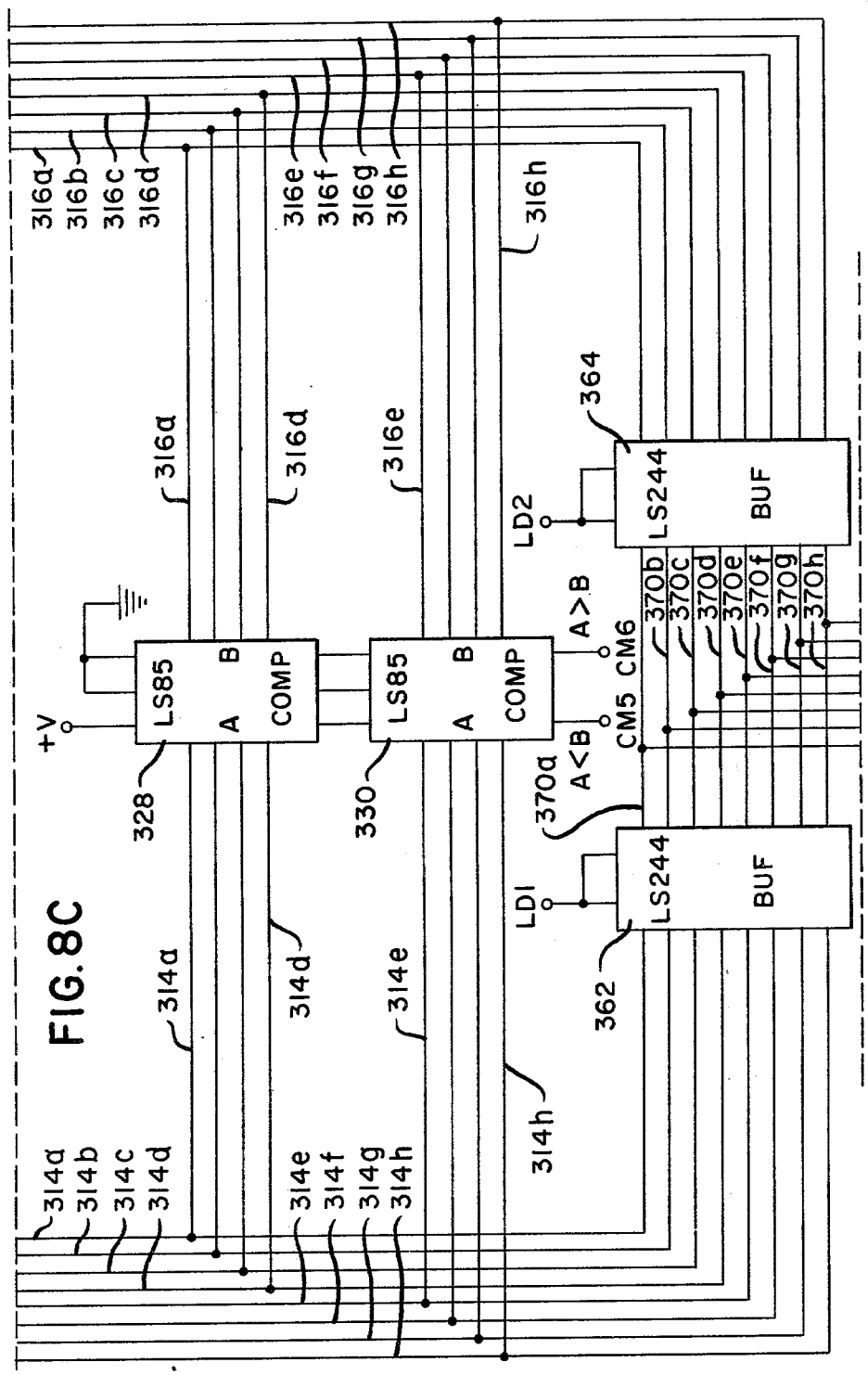

The accumulated distance of the peaks for each template stored in the flip-flop 294 (FIG. 6C) will result in the value appearing on the output lines 308a–308h inclusive, which lines are coupled to the inputs of a pair of LS273 flip-flops 310 (FIG. 8A) and 312 (FIG. 8B). Upon the inputting of the first distance over lines 308a–308h inclusive, fthe output of the flip-flops 310 and 312 will have high signals appearing on its output lines 314a–314h inclusive and 316a–316h inclusive respectively. These signals are inputted into a plurality of LS85 comparators 320–326 inclusive (FIG. 8A) which will compare the distance appearing on lines 308a–308h inclusive with the value of the distances appearing on the output lines 314a–314h inclusive and 316a–316h inclusive. The comparators 322 and 326 will output signals CM1–CM4 inclusive as a result of comparing the inputting values. The function of the comparators 320–326 inclusive is to determine the two minimum distances of all the distances generated as a result of comparing the templates with the peak amplitudes in a manner described previously. As each value of the distance is inputted over lines 308a–308h inclusive, the values will be compared with the two minimum distances ($D_{m1}$) stored in flip-flop 310 and ($D_{m2}$) stored in the flip-flop 312. The output values of the flip-flops 310 and 312 are transmitted to a pair of comparators 328 and 330 (FIG. 8C) to determine if they are equal or not. As the result of comparing the two minimum values, the comparator 330 will output the signals CM5 and CM6. The values CM1–CM6 inclusive are inputted into a decoder circuit (FIG. 14) which comprises a plurality of AND gates 332–336 whose outputs are coupled to the D inputs of a pair of LS74 flip-flops 328 and 340 through OR gates 342 and 344. The Q outputs of the flip-flops 338 and 340 are coupled through a pair of OR gates 346 and 350 to output the clock signals CLK1 and CLK2 over lines 352 and 354 to the flip-flops 310 and 312 (FIGS. 8A and 8B) enabling the flip-flops to store the input value appearing on lines 308a–308h inclusive upon finding that the input value is less than the minimum value stored in the flip-flops 310 and 312.

Figure 13:
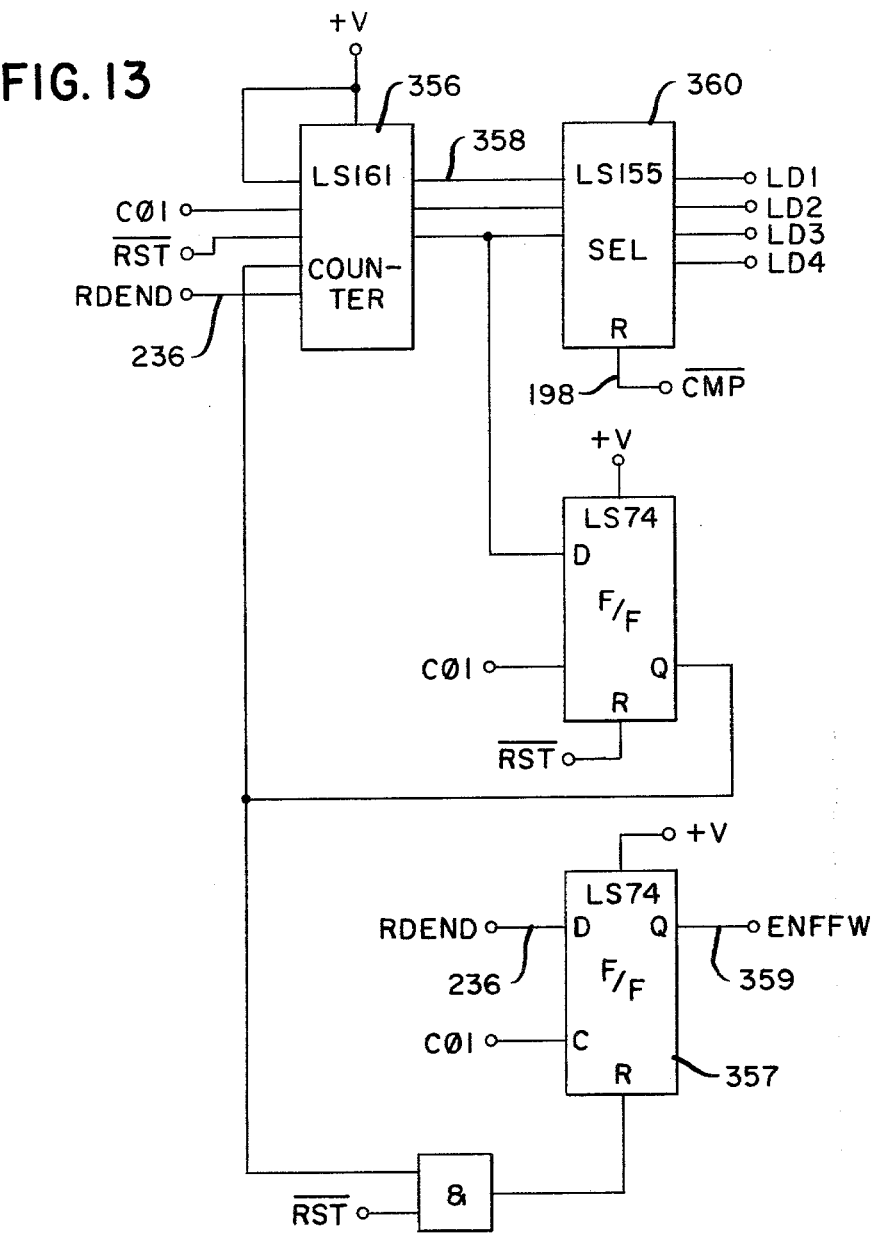
FIG. 13 discloses logic circuits for selecting the data outputted by the template matching logic circuits.

Referring now to FIG. 13, there is shown an LS161 counter 356 which outputs the count 0–3 inclusive over lines 358 to a LS155 selector 360 which outputs in succession the low load signals LD1–LD4 inclusive. The load signals LD1–LD4 inclusive are outputted to a pair of LS244 buffers (FIG. 8C) and a pair of LS374 flip-flops 366 and 368 (FIG. 8D). Upon the signals LD1 and LD2 going low, the buffers 362 and 364 will be enabled to output the minimum distances $D_{m1}$ and $D_{m2}$ appearing on the output of the flip-flops 310 and 312 over output lines 370a–370h inclusive for storage in a pair of 190 3341 output buffers 372 and 374 (FIG. 12) when enabled by the signal $C\phi 3$ going high. Upon the raising of an output ready signal OTRD (FIG. 4G), which is transmitted to the processor 34 (FIG. 3) over line 240, the processor will output the shift out signal OTSF over line 376 (FIG. 12) which signal will clock a flip-flop 378 to output a high signal over line 380 enabling the output buffers to output data over lines 120a–120h inclusive to the processor 34 (FIG. 3) where, as described more fully hereinafter, the processor will apply threshold voltages to the two minimum values to select the character representing the unknown character waveform 36 (FIG. 2). A high signal is inputted into the D input of the flip-flop 378 as a result of the high signals OR1 and OR2 outputted by the buffers 372 and 374 over lines 365 and 367 respectively to an AND gate 369.

Figure 11:
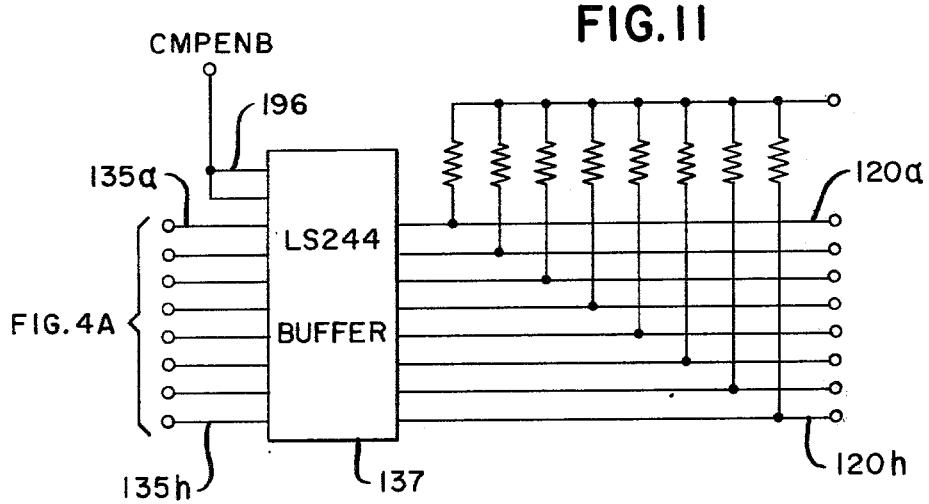
FIG. 11 discloses a logic circuit for the output buffer used in the template matching logic circuits.

The data being outputted over the output lines 370a–370h inclusive (FIG. 8D) includes the two minimum values being outputted by the buffers 362 and 364 (FIG. 8C) together with the template number corresponding to the two minimum values. During the time the data representing the distance of a template is being inputted over lines 308a–308h inclusive (FIG. 8A), the number of the template which is present on the output lines 220a–220e inclusive and 226 (FIG. 4G) will be inputted into the flip-flops 366 and 368. Depending on the finding that the distance corresponding to the template is a minimum distance, the flip-flops 366 and 368 will first store the template number representing the two minimum distances upon the generation of the clock signals CLK1 and CLK2 (FIG. 14) and will then subsequently be enabled by the load signals LD3 and LD4 to output over lines 370a–370h inclusive the numbers of the templates corresponding to the two minimum distances. This data is transmitted over lines 120a–120h inclusive to the processor 34 for processing in the manner that will now be described. As shown in FIG. 11, the eight bits of data outputted over lines 135a–135h (FIG. 4A) is also outputted into an LS244 buffer 137 for outputting of the samples to the processor 34 for use in recognizing the characters.

Figure 16A:
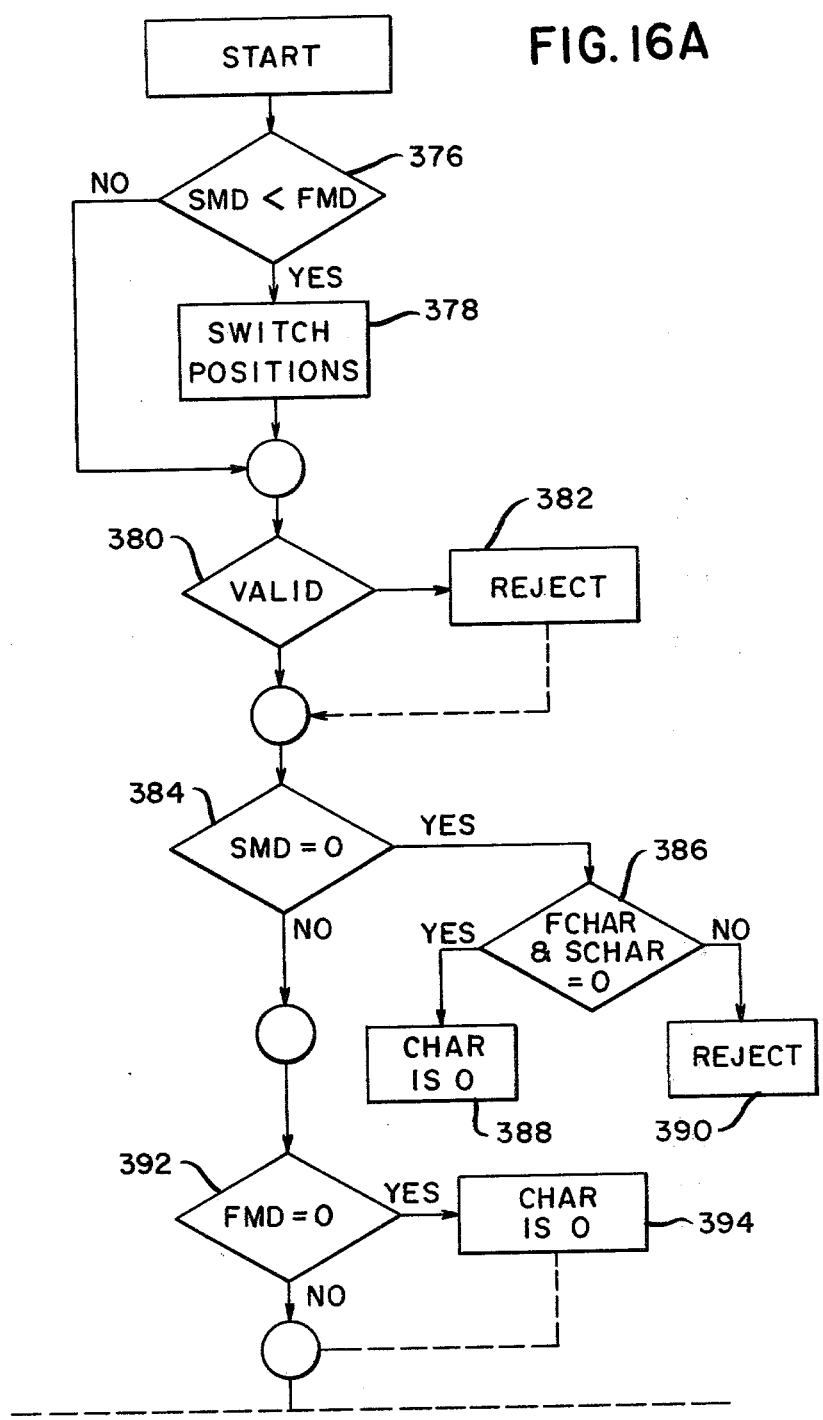

Referring now to FIGS. 16A and 16B, there is disclosed a flowchart of the operation of the processor 34 in applying thresholds to determine if the value of the minimum distances are capable of identifying the unknown character. Upon receiving the first minimum distance (FMD) and the second minimum distance (SMD), the processor will determine which of the two data bytes representing the minimum distances is the first minimum distance by comparing the two distances (block 376). If the second minimun distance is less than the first minimum distance, the minimum distances (FMD), (SMD) and the characters (FCHAR and SCHAR) are rearranged to be in proper order. The processor will then compare the value of the first and second character templates (block 380) to determine if they are valid templates. If they are not, the processor will reject the data (block 382).

The processor will then check the second minimum distance (SMD) to see if it is equal to 0 (block 384). If it is, then the first minimum distance is equal to 0 and the first and second character templates represent the character 0. In the case where there are a multiple number of templates for the character 0, the processor will check to see that both characters are 0 (block 386). If they are, the processor will indicate that the unknown character is a 0 (block 388). If not, the processor will generate a reject signal (block 390) for transmission to a utilization device.

If the second minimum distance (SMD) is not equal to 0, the processor will check the first minimum distance (FMD) to see if it is equal to 0 (block 392). If the first minimum distance is 0, the unknown character is outputted as the character corresponding to the first character template (block 394) to the utilization device which thus ends the character recognition operation. If the first minimum distance is not equal to 0, the processor will check a flag to determine if the character is in the amount field. If it is, there are certain characters such as U, D, T, which must be excluded from the amount field. If the first character is equal to any of these characters (block 396), the processor will reject (block 400) the character and end the operation. If the first character is not an excluded character, the processor will look up the allowed maximum distance for a first character minimum distance together with the allowed differences between the first and second minimum distance (block 402). If the first minimum distance is not in the amount field, the processor looks up the allowed maximum distance for the first minimum distance and the allowed differences between the first and second distances when not in the amount table (block 404). After obtaining this information, the processor will check to see if the first minimum distance is greater than the allowed distance. If it is, it will reject the characters (block 408). If it is not, the processor will subtract the first minimum distance from the second minimum distance and compare the result with the allowed differences (block 410). If the distance is less than the allowed resolution and both characters associated with the two minimum distances do not represent 0 (block 412), the processor will reject the data (block 414) and return to a state to await the next data outputted by the template matching unit 32 (FIG. 1). If the resolution is greater than the allowed resolution, the processor will generate signals (block 416) indicating the character represented by the first character (FCHAR) as the recognized character.

Below is a group of program listings in the Intel 8086 assembly language for the system operation described above.

| ISIS-II PL/M-86 V1.1 COMPILATION OF MODULE DISTMATCHMODULE |
|---|
| OBJECT MODULE PLACED IN :F1:READER.OBJ |
| COMPILER INVOKED BY: PLM86 :F1:READER.SRC PAGEWIDTH(77) |
| DATE(JULY 4/79) |

| | PL/M-86 COMPILER | DISTMATCHMODULE |
|---|---|---|
| 1 | | DIST$MATCH$MODULE: DO; |
| 2 | 1 | DECLARE NTMPLS LITERALLY '18', NAMT$TMPLS LITERALLY '15'; |
| 3 | 1 | DECLARE PARAMETER (27φ) WORD EXTERNAL, TEMPLATE STRUCTURE (POSITIONS (14) BYTE, VALUES (14) BYTE, CHECK (4) BYTE) EXTERNAL; |
| 4 | 1 | RECOG: PROCEDURE (AMOUNT$FIELD) BYTE PUBLIC; |
| 5 | 2 | DECLARE AMOUNT$FIELD BYTE, UPPER$DIST$RES WORD DATA (φ42φH), PEAKS (14) BYTE AT (@TEMPLATE.VALUES), LOCATIONS (14) BYTE AT (@TEMPLATE.POSITIONS), (FMD,SMD,FMDLOC,SMDLOC) BYTE AT (@TEMPLATE. CHECK), (I,OFFSET) BYTE, (DIST$RES, INDEX) WORD, (FQ$DIST, EQ$RES) BYTE AT (@DIST$RES), REJ$CHAR BYTE DATA (12), CHARACTERS (*) BYTE DATA(φ, φ, φ, φ, φ, 1,2,3,4,5,6,7,8,9,14,13,1φ,11); /* START OF EXECUTION */ /* SWITCH AROUND 1ST AND 2ND MINIMA IF NECESSARY */ |
| 6 | 2 | IF SMD < FMD THEN |
| 7 | 2 | DO; |
| 8 | 3 | I = FMD; FMD = SMD; SMD = I; |
| 11 | 3 | I = FMDLOC-1; FMDLOC = SMDLOC-1; SMDLOC = I; |
| 14 | 3 | END; |
| 15 | 2 | ELSE DO; |
| 16 | 3 | FMDLOC = FMDLOC-1; |
| 17 | 3 | SMDLOC = SMDLOC-1; |
| 18 | 3 | END; |
| 19 | 2 | IF SMDLOC = φFFH THEN SMDLOC = φ; /* REJECT IF THE MINIMUM TEMPLATES INDICATED ARE NOT ALLOWED */ |
| 21 | 2 | IF FMDLOC >= NTMPLS OR SMDLOC >= NTMPLS THEN RETURN REJ$CHAR; |

-continued

ISIS-II PL/M-86 V1.1 COMPILATION OF MODULE DISTMATCHMODULE
OBJECT MODULE PLACED IN :F1:READER.OBJ
COMPILER INVOKED BY: PLM86 :F1:READER.SRC PAGEWIDTH(77)
DATE(JULY 4/79)
PL/M-86 COMPILER  DISTMATCHMODULE

| | | |
|---|---|---|
| | | /* CHECK FOR A MULTIPLE TEMPLATE MATCH AND REJECT UNLESS THE TWO TEMPLATES ARE FOR 'φ'. */ |
| 23 | 2 | IF SMD = φTHEN |
| 24 | 2 | IF SMDLOC <= 4 AND FMDLOC <= 4 THEN |
| 26 | 2 | RETURN φ; ELSE RETURN REJ$CHAR; |
| | | /* IF COMPLETE TEMPLATE MATCH, RETURN CHARACTER IMMEDIATELY. */ |
| 27 | 2 | IF FMD = φ THEN RETURN CHARACTERS(FMDLOC); |
| | | /* NO COMPLETE TEMPLATE MATCH; COMPARE DISTANCE AND RESOLUTION —*/ |
| 29 | 2 | IF AMOUNT$FIELD THEN |
| 3φ | 2 | DO; /* GET MULTI-DISTANCE PARAMETERS */ |
| | | /* EXCLUDE "U", "D" AND "T" (LAST THREE TEMPLATES) FROM THE AMOUNT FIELD. */ |
| 31 | 3 | IF FMDLOC > NAMTSTMPLS-1 THEN RETURN REJ$CHAR; |
| 33 | 3 | INDEX = FMDLOC*NTMPLS + SMDLOC; |
| 34 | 3 | DIST$RES = PARAMETER (INDEX); |
| 35 | 3 | END; |
| 36 | 2 | ELSE DIST$RES = UPPER$DIST$RES; |
| | | /* REJECT IF 'FMD' > THAN THE ALLOWED DISTANCE OR RESOLUTION < THAN ALLOWED. IF BOTH TEMPLATES ARE FOR 'φ', THEN ALLOW RESOLUTION TO BE ZERO. */ |
| 37 | 2 | IF FMD > EQ$DIST THEN RETURN REJ$CHAR; |
| 39 | 2 | IF (SMD − FMD) < EQ$RES THEN |
| 40 | 2 | IF FMDLOC > 4 OR SMDLOC > 4 THEN |
| 41 | 2 | RETURN REJ$CHAR; |
| 42 | 2 | IF AMOUNT$FIELD THEN DO; |
| | | /* DATA PASSES MULTIPLE DIST/RES TEST; NOW APPLY FEATURE FORCING TESTS. APPLY FEATURE FORCING TESTS ONLY IN THE AMOUNT FIELD. */ |
| | | /* CHECK FOR EXISTENCE OF A FEATURE IN THE MIDDLE OF A '5' & REJECT IF FOUND. (COULD BE A '7'.) */ |
| 44 | 3 | IF FMDLOC = 9 THEN |
| 45 | 3 | DO; |
| 46 | 4 | IF PEAKS(6) < −16 THEN RETURN REJ$CHAR; |
| 48 | 4 | END; |
| | | /* FORCE 2ND +VE FEATURE ON '6' */ |
| 49 | 3 | ELSE IF FMDLOC = 10 THEN |
| 5φ | 3 | DO; |
| 51 | 4 | IF PEAKS(3) < 14 THEN RETURN REJ$CHAR; |
| 53 | 4 | END; |
| | | /* IF "Z" TEMPLATE SELECTED, REJECT SINCE THIS TEMPLATE MUST FIT EXACTLY */ |
| 54 | 3 | ELSE IF FMDLOC = 3 THEN RETURN REJ$CHAR; |
| | | /* IF '2' IS RECOGNIZED, CHECK TWO WINDOWS TO DETERMINE IF IT MAY BE A '5' */ |
| 56 | 3 | ELSE IF FMDLOC = 6 THEN |
| 57 | 3 | DO; |
| 58 | 4 | IF (PEAKS(8) < −92) OR (PEAKS (2) > −12) THEN RETURN REJ$CHAR; |
| 6φ | 4 | END; |
| | | /* IF '3' IS RECOGNIZED, CHECK -W5. (NOTE THE TWO TEMPLATE SUBSECTIONS IN -W5). */ |
| 61 | 3 | ELSE IF FMDLOC = 7 THEN |
| 62 | 3 | DO; |
| 63 | 4 | IF LOCATIONS(1φ) = 38 THEN |
| 64 | 4 | DO; |
| 65 | 5 | IF PEAKS(1φ) > −1φ THEN RETURN REJ$CHAR; |
| 67 | 5 | END; |
| 68 | 4 | ELSE IF PEAKS(1φ) > −13 THEN RETURN REJ$CHAR; |
| | | END; |
| | | END; |
| | | /* PROGRAM EXECUTES HERE IF DATA PASSES ALL TESTS ===> RECOGNITION */ |
| 72 | 2 | RETURN CHARACTERS(FMDLOC); |
| 73 | 2 | END RECOG; |
| 74 | 1 | /* NEXT CHAR IS INPUT*/ |

-continued

| ISIS-II PL/M-86 V1.1 COMPILATION OF MODULE DISTMATCHMODULE |
|---|
| OBJECT MODULE PLACED IN :F1:READER.OBJ |
| COMPILER INVOKED BY: PLM86 :F1:READER.SRC PAGEWIDTH(77) |
| DATE(JULY 4/79) |

PL/M-86 COMPILER   DISTMATCHMODULE

```
129        2      NUM$FLAG = NUMERIC(CHAR); /*CHECKED FOR
                  NUMERIC*/
13φ        2      IF NUM$F21D
           VARIABLE AREA SIZE  = φφφ6H 6D
           MAXIMUM STACK SIZE  = φφφ6H 6D
           144 LINES READ
           φPROGRAM ERROR(S)
END OF PL/M-86 COMPILATION
```

While the preferred embodiment of the present invention has been described in detail for recognizing characters in a standard E-13B character font, the character recognition system could be easily adapted by a person of ordinary skill in the art to recognize characters and symbols from any standard character font without departing from the spirit of the invention. Furthermore, many of the changes and details of the preferred embodiment may be made without departing from the spirit or scope of the invention as defined in the appended claims.

What is claimed is:

1. In a character recognition system wherein feature characteristics of an analog waveform representing an unknown character are compared with the feature characteristics of a plurality of known characters, an apparatus for recognizing the unknown character, comprising:
   (a) first and second storage unit for storing the feature characteristics of an unknown character and the feature characteristics of a plurality of known characters respectively;
   (b) first comparison means coupled to said first and second storage unit for comparing the location of each feature characteristic of the unknown character with the location of the feature characteristics of the known characters to produce a first signal representing the difference therebetween;
   (c) first counter means operable to output a count equal to the number of feature characteristics stored in said first storage unit, said first counter means coupled to said first storage unit and outputting a plurality of counts each of which enables each of said feature characteristics stored in said first storage unit to be outputted as an address to said second storage unit enabling said second storage unit to output the feature characteristics of a known character to said first comparison means;
   (d) means coupled to said first comparison means for accumulating the first signals for each known character;
   (e) second comparison means for comparing the accumulated differences of each of the known characters to provide a plurality of second signals representing two minimum differences;
   (f) first means for storing said second signals;
   (g) second means for storing the known characters associated with said second signals;
   (h) and processing means coupled to said first and second storing means for applying a plurality of threshold values to the difference between said second signals to enable said processing means to identify the unknown character in accordance with the second signal having the minimum difference.

2. The apparatus of claim 1 which further includes second counter means coupled to said first counter means and said second storage unit, said second counter means enabled to output a count representing a known character to said second storage unit upon said first counter means outputting a count equal to the number of feature characteristics of the unknown character whereby said second storage unit will output feature characteristics of another known character to said first comparison means in response to receiving the feature characteristics of the unknown character.

3. The apparatus of claim 2 in which said accumulating means accumulates the differences between the locations of the feature characteristics of the unknown and the known characters, said apparatus further including a third storage unit coupled to said accumulating means and said first comparison means for storing said first signals, said comparison means adapted to compare the accumulated differences outputted by said accumulating means with the accumulated differences stored in said third storage unit enabling said third storage unit to store the accumulated differences having the minimum difference.

4. The apparatus of claim 3 which further includes a fourth storage unit coupled to said second counter means for storing the output of said second counter means and logic means coupled to said second comparison means and said fourth storage unit for enabling said fourth storage unit to store the output of said second counter means upon said second comparison means finding a minimum difference, the output of said second counter means identifying the known character associated with the minimum difference.

5. The apparatus of claim 4 which further includes a fifth storage unit coupled to said third and fourth storage units for storing the values representing the two minimum differences and their known characters, said second counter means coupled to said processing means for outputting to said processing means a control signal upon reaching a count equal to the number of known characters available whereby said processing means will enable said fifth storage unit to output the stored values to said processing means in response to the outputting of said control signal.

6. In a character recognition system wherein peak values representing first features of an analog waveform corresponding to the shape of an unknown character are compared to second features of a plurality of known characters, an apparatus for processing features of and recognizing the unknown character comprising:
   means for outputting a plurality of first features representing the location of the peak values of an analog waveform;

first means for storing the first features of the unknown character;

second means for storing the second features of a plurality of known characters;

first comparison means coupled to said first and second storing means for comparing the first features of the unknown character with the second features of the known characters to provide a first binary signal representing the difference between the first and second features;

first counter means connected to said first storing means and responsive to the outputting of said first features for outputting counts to said first storing means enabling said first storing means to store said first features and to output said first features to said comparison means;

second counter means coupled to said first counter means and said second storing means and enabled, upon the output count of said first counter means reaching a count equal to the number of first features outputted by said outputting means, to output an enabling signal representing a known character to said second storing means whereby said second storing means will output a plurality of second features of a known character to said comparison means;

means connected to said comparison means for accumulating the first binary signals outputted by said comparison means for each known character;

second comparison means connected to said accumulating means for comparing the accumulated binary signals of each known character to output second binary signals representing the two minimum accumulated first binary signals;

and processing means coupled to said second comparison means for comparing the difference between said second binary signals with a plurality of threshold values enabling said processing means to identify the unknown character with the known character having the minimum difference.

7. The apparatus of claim 6 which further includes a latch member coupled to said accumulating means for storing the first binary signal outputted by said accumulating means, said latch member outputting said first binary signals to said accumulating means enabling said accumulating means to output to said latch member the sum of said first binary signals, said apparatus further including third means for storing the output of said latch member.

8. The apparatus of claim 7 which further includes fourth storing means coupled to said second counter means for storing the output of said second counter means when enabled, said second comparison means outputting a plurality of first control signals in accordance with the second binary signals found and logic means coupled to said second comparison means and said fourth storing means for enabling said fourth storing means to store said enabling signal representing the known character associated with said second binary signals.

9. The apparatus of claim 8 which further includes fifth storing means coupled to said third and fourth storing means for storing said second binary signals and said enabling signals representing the two minimum differences and their known characters, said second counter means coupled to said processing means for outputting to said processing means a control signal upon reaching a count equal to the number of known characters available whereby said processing means will enable said fifth storing means to output the stored signals to said processing means in response to the outputting of said control signal.

* * * * *